United States Patent
Aeschlimann et al.

(10) Patent No.: US 8,151,541 B2
(45) Date of Patent: Apr. 10, 2012

(54) ANCHORING IN A CONSTRUCTION MODEL

(75) Inventors: Marcel Aeschlimann, Ligerz (CH);
Laurent Torriani, Lamboing (CH);
Mario Lehmann, Les Pommerats (CH);
Jörg Mayer, Niederlenz (CH)

(73) Assignee: Woodwelding AG, Zug (CH)

( * ) Notice: Subject to any disclaimer, the term of this patent is extended or adjusted under 35 U.S.C. 154(b) by 329 days.

(21) Appl. No.: 12/442,304

(22) PCT Filed: Sep. 19, 2007

(86) PCT No.: PCT/CH2007/000460
§ 371 (c)(1),
(2), (4) Date: Apr. 15, 2009

(87) PCT Pub. No.: WO2008/034278
PCT Pub. Date: Mar. 27, 2008

(65) Prior Publication Data
US 2010/0043345 A1 Feb. 25, 2010

Related U.S. Application Data

(60) Provisional application No. 60/826,303, filed on Sep. 20, 2006.

(51) Int. Cl.
*E04B 1/00* (2006.01)

(52) U.S. Cl. ........... 52/745.21; 52/296; 52/704; 52/232; 411/22; 411/82.5; 405/259.5

(58) Field of Classification Search ............. 411/41, 411/22, 82.5; 52/703, 232, 296, 298, 704; 52/706, 745.21; 405/259.4, 259.5, 259.3, 405/259.1; 428/67
See application file for complete search history.

(56) References Cited

U.S. PATENT DOCUMENTS

| | | | | |
|---|---|---|---|---|
| 3,308,585 | A | * | 3/1967 | Fischer ............... 405/259.5 |
| 3,952,948 | A | * | 4/1976 | Nelson et al. .......... 238/243 |
| 4,564,315 | A | * | 1/1986 | Rozanc ............... 405/259.6 |
| 4,572,708 | A | * | 2/1986 | Fischer ................... 411/22 |
| 4,673,320 | A | * | 6/1987 | Froehlich ................ 411/21 |
| 5,073,064 | A | * | 12/1991 | Leonard et al. ....... 405/259.6 |
| 5,437,750 | A | | 8/1995 | Rinse et al. |

FOREIGN PATENT DOCUMENTS

| | | |
|---|---|---|
| WO | 98/00109 | 1/1998 |
| WO | 00/79137 A1 | 12/2000 |
| WO | 03/046390 A2 | 6/2003 |
| WO | 03/046390 A3 | 6/2003 |
| WO | 2005/045263 A1 | 5/2005 |
| WO | 2006/002569 A1 | 1/2006 |

* cited by examiner

*Primary Examiner* — William Gilbert
(74) *Attorney, Agent, or Firm* — Rankin, Hill & Clark LLP

(57) ABSTRACT

A method suitable for anchoring an anchoring element in an object, which anchoring element is compressible in the direction of a compression axis under local enlargement of a distance between a peripheral anchoring element surface and the compression axis. The anchoring element has a coupling-in face which serves for coupling the mechanical vibrations into the anchoring element, which coupling-in face is not parallel to the compression axis. The anchoring element further includes a thermoplastic material which in areas of the peripheral surface enlargement forms at least a part of the surface of the anchoring element, the method includes the steps of: providing a bore in the object; positioning the anchoring element in the bore; and coupling the compressing force and the mechanical vibrations through the coupling-in face into the positioned anchoring element.

21 Claims, 10 Drawing Sheets

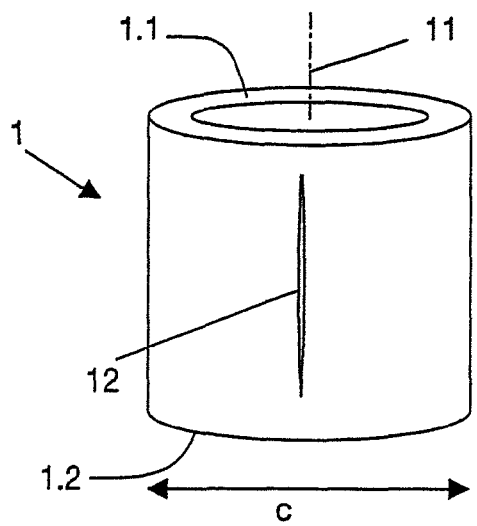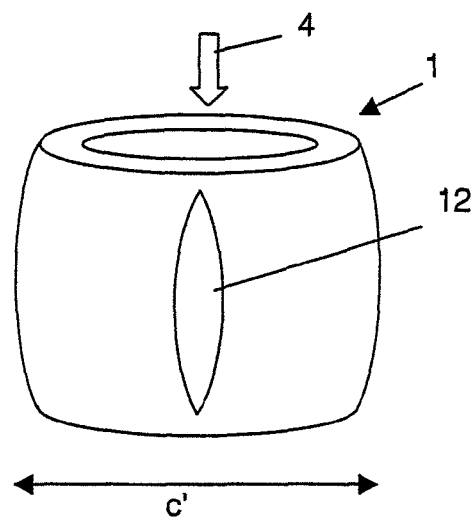
Fig. 1a  Fig. 1b
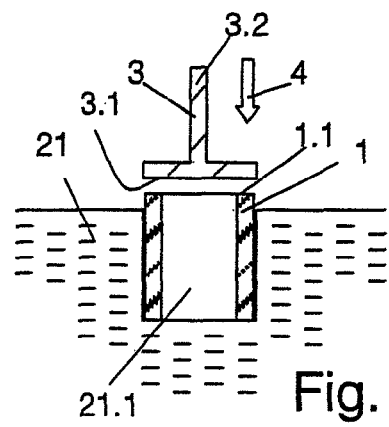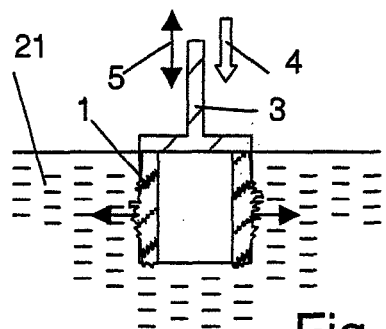
Fig. 2a  Fig. 2b
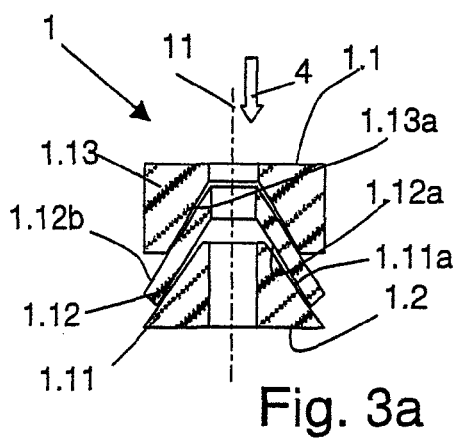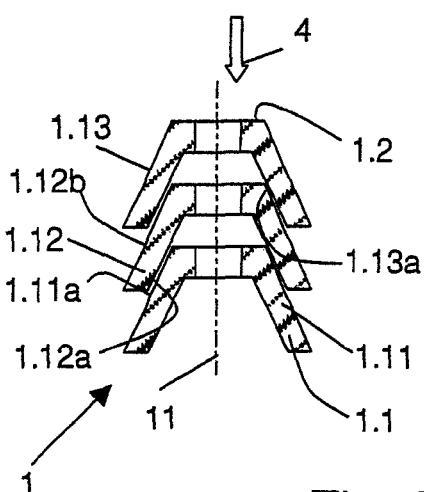
Fig. 3a  Fig. 3b

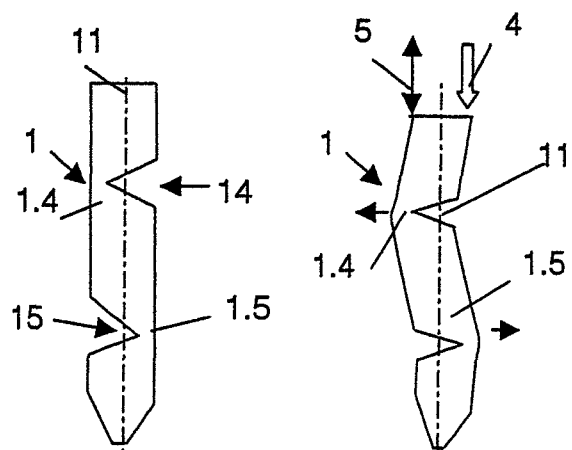
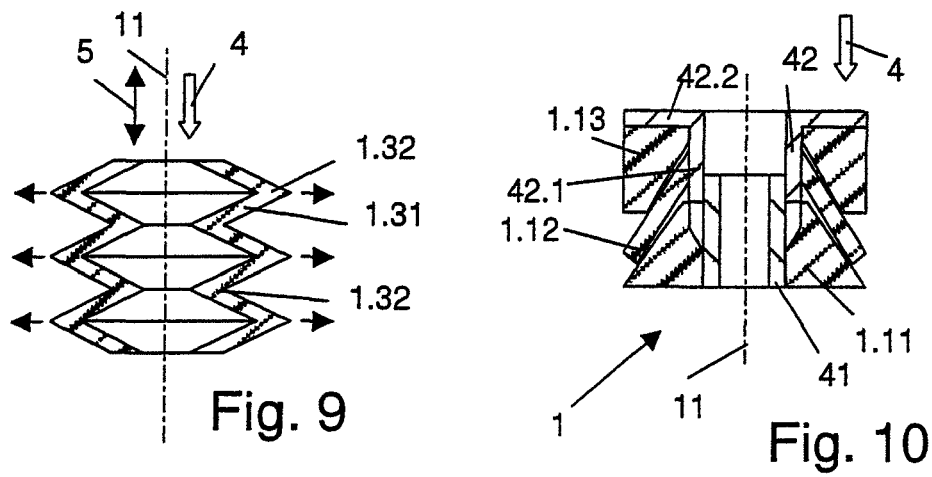
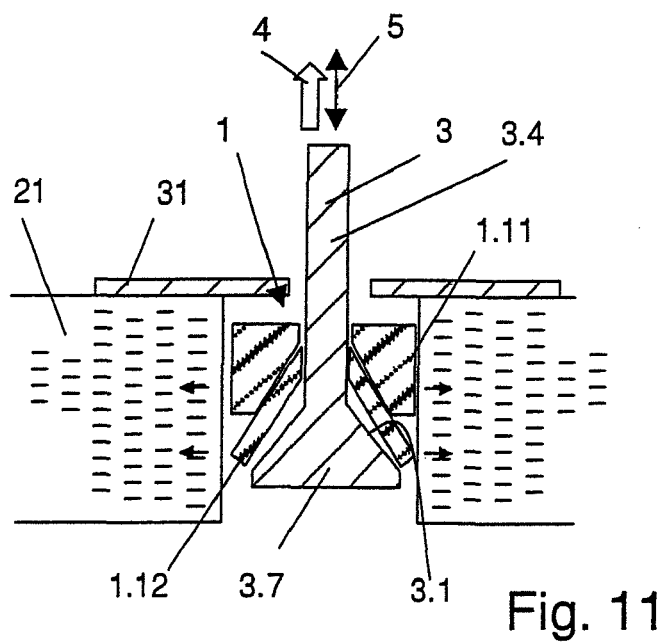

ANCHORING IN A CONSTRUCTION MODEL

BACKGROUND OF THE INVENTION

1. Field of the Invention

The invention is in the field of construction, especially building industry, timber construction, furniture industry and mechanical construction and concerns a method of anchoring an anchoring element in an object of construction material, which object has a porous or structured surface, the object surface, into which the anchoring element is anchored, being of wood, a wood composite (such as chipboard, particle board, oriented strand board etc), cardboard, concrete, brick, plaster, stone (such as sandstone) or industrial hard foam, into which a liquefied material can penetrate under pressure. The invention also concerns a corresponding anchoring element to be anchored in an object, and a corresponding device.

2. Description of Related Art

Methods of anchoring connecting elements in an opening in a fibrous or porous building material with the aid of mechanical vibrations are known from publications such as WO 98/00109, WO 00/79137 and WO 2006/002569. According to these methods, a connecting element is placed in a prefabricated opening of the object or pressed against the surface of the object by a directed force, which in turn creates an opening. While a force acts upon the connecting element in the direction of an axis of the opening, the element is excited by mechanical vibrations. The connecting element comprises thermoplastic material at least on one surface, which comes into contact with the material of the object during this procedure. The energy of the mechanical vibrations is set to liquefy thermoplastic material in the area of a predetermined anchoring point by mechanical vibrations and to press it into the pores or surface structures of the object by pressure building up at the anchoring point between a wall of the opening and the connecting element, thus forming a most effective macroscopic anchoring.

There are situations however, in which anchoring of connecting elements by mechanical vibrations according to the state-of-the-art technology does not suffice or in which, e.g. due to limited accessibility of the opening, it is not possible to excite a known connecting element with sufficient vibratory energy to ensure a reliable anchoring by the known methods.

BRIEF SUMMARY OF THE INVENTION

It is therefore the object of the invention to provide a method of anchoring an anchoring element (the term used in this text for a connecting element or any other piece to be anchored directly in the object) and a corresponding anchoring element suitable for being anchored in the object material under conditions, which hitherto made such anchoring impossible or extremely difficult.

A first aspect of the invention provides an anchoring element suitable for being anchored in an opening in the object of construction material with the aid of mechanical vibration. The anchoring element is able to be compressed in the direction of a chosen compression axis with the effect of a local enlargement of a distance between a peripheral anchoring element surface and the compression axis (measured at right angles to the compression axis). The anchoring element includes a coupling-in face for the coupling of a compressing force and of the mechanical vibration into the anchoring element, and a thermoplastic material, which forms at least a part of the anchoring element surface in the region of the aforementioned distance enlargement. A method of anchoring such an anchoring element in an object comprises the following steps:

providing an opening in the object positioning the anchoring element in the opening so that the compression axis extends essentially parallel with an opening axis;

coupling a compressing force and mechanical vibrations via the coupling-in face into the positioned anchoring element, thereby causing the anchoring element to be compressed and, due to the distance enlargement, to be pressed at least locally against the side walls of the opening and therewith causing the thermoplastic material to liquefy at least partly where it is in contact with the side walls and to be pressed into the structures of the object, in order to form a form-fit connection after re-solidification.

A further subject of the invention is an anchoring element to be anchored by this method.

In the present text, the term "anchoring element" is used for describing any element fashioned for being anchored in an object of construction material. The term is used primarily for connecting elements, i.e. elements serving to connect the object with a further object. Such connecting elements can be used in a manner similar to conventional screws, dowels, nails, hooks, etc., but the term "anchoring element" also describes elements that are anchored in an object as such and do not require a further attachment.

The object in which the anchoring element is to be anchored, —this too applies to all aspects of the invention—is at least partly made of a material which is rigid and porous, includes a structured surface (i.e. a surface with uneven patches, porous openings, or similar structures e.g. mechanically produced), and/or which can be penetrated by a liquefied material under pressure. Preferably the object consists at least partly of wood or a similar material, e.g. material made from wood chips or shavings or a composite containing the latter. However, the material may also be cardboard (or paperboard), concrete, metallized foam, hard plastic foam, brick, stone or any other material suitable for construction and in line with the aforementioned definition.

In this text "thermoplastic material" is used for describing a material comprising at least one thermoplastic component able to be liquefied by mechanical vibrations while in contact with a hard surface. The thermoplastic material makes up at least a part of the anchoring element; it may form the whole anchoring element. Besides thermoplastics, the thermoplastic material can also include non-thermoplastic components, such as reinforcing fibers, reinforcing splints, filling materials etc. Non-thermoplastic components can be evenly distributed in the thermoplastic material or be present in varying concentrations. The anchoring element can further include areas free of thermoplastic material. Such areas may be of metal, glass, ceramic material, or of non-thermoplastic materials or thermoplastic material(s) liquefiable at substantially higher temperatures compared to the basic thermoplastic material.

The mechanical frequency of the mechanical vibrations—this too applies to all aspects of the invention described in this text—often lies between 2 kHz and 200 kHz and their amplitudes are around 10 µm, i.e. between 1 µm and 100 µm. If the thermoplastic material is to take over a load bearing function and is to liquefy only in the named contact areas, it ought to have an elasticity coefficient of more than 0.5 GPa and plastification temperatures of up to 200° C., of between 200° C. and 300° C. or of more than 300° C.

An opening in the object—whether it is a through hole or a blind hole—into which an anchoring element is placed for subsequent anchoring is in the following termed as a "bore".

Of course an anchoring according to the invention can also take place in an opening not specifically drilled for the purpose, but e.g. contained in the natural state of the object or produced for some other reason. Neither is the use of the term "bore" restricted to openings produced by means of a particular technique but extends e.g. to openings produced by punching, laser cutting, or cutting with the aid of particle radiation etc., as well as to openings contained in the natural state of the object.

In most embodiments of the invention according to its first aspect, although not necessarily, the compression causes a local enlargement of an outer cross-section at right angles to the compression axis. The term "outer cross-section" describes the cross sectional area encompassed by an outer contour of the element cut at right angles to the compression axis, i.e. the presence of possible cavities within the anchoring element is disregarded in the calculation of the outer cross-section. In many cases—although not necessarily—an enlargement of the outer cross-section signifies an enlargement of the cross sectional area encompassed by a convex envelope (convex hull) of the anchoring element body.

The coupling-in face is advantageously at least partly planar and extends at an angle to the compression axis. "At an angle to the compression axis" in this context means, "not parallel to the compression axis". The coupling-in face being perpendicular to the compression axis, i.e. at a right angle, is particularly advantageous. An angle between the compression axis and the coupling-in face of at least 45°, or better still, of at least 60° is generally preferred.

The selected compression axis is generally a specific axis of the anchoring element, i.e. the anchoring element is fashioned such that compression along this compression axis is clearly defined and controlled and results in the desired local enlargement of the distance between the peripheral surface and the compression axis, i.e. the desired enlargement of the cross sectional area. In particular, the compression effect along the compression axis at a given (small) compressing force can be substantially greater than along other axes. Compression along other axes, for example perpendicular to the chosen compression axis, in addition or as an alternative cannot e.g. result in an enlargement of the cross sectional area perpendicular to the chosen axis, cannot be carried out in a controlled manner and/or only with excessive energy. In some embodiments the compression axis may be marked by symmetry, e.g. the anchoring element may be approximately rotationally symmetrical in relation to the compression axis.

The term "liquefied" describes a condition of the thermoplastic material in which it is plastic to the extent that, while under pressure, it can penetrate pores whose dimensions are smaller by at least one magnitude than a characteristic dimension of the anchoring element. In this sense "liquefied" also applies to thermoplastic material when it comprises a comparatively high viscosity of e.g. up to $10^4$ mPa·s.

The invention according to the first aspect treads a new path compared with the state-of-the-art technology. The state-of-the-art technology is familiar with methods of providing an opening in the object and subsequently anchoring the—e.g. roughly pin shaped—anchoring element in the opening by positioning it in the opening and applying ultrasonic vibration to it. During this process, the thermoplastic material of the anchoring element may be liquefied on the circumferential surfaces of the anchoring element and, if applicable, penetrate pores along the bore walls. However, it is found that the anchoring effect of this "non-pressurized" penetration into pores is often rather moderate. According to the state-of-the-art technology it is possible to achieve a lateral pressure by shaping the bore conically, which is elaborate. In contrast, according to the invention, pressure in a lateral direction is increased by the compression and accompanying enlargement of the distance between compression axis and a peripheral surface of the anchoring element. This, on the one hand, increases the friction forces generated on the circumferential anchoring element surface and causes the energy coupled into the anchoring element via the mechanical vibrations to induce a liquefaction of the thermoplastic material precisely in that region, i.e. laterally, along the circumferential surface. On the other hand the lateral pressure also drives the liquefied material into laterally existing pores or other structures (surface structures, cavities etc.) of the bore and thus results in a particularly solid anchoring.

Hence the anchoring element according to the invention makes it possible to exert pressure upon the lateral surfaces of the bore. This enables an anchoring of the anchoring element even in situations where no pressure can be applied to the bottom of the bore—e.g. because the object is very brittle and/or very thin—or where the bore has no bottom because it is through-going. In such a case, additional means for absorbing the compressing force must be provided. Such means are discussed in detail below.

The anchoring element may be designed in various ways, wherein the compression of the anchoring element is effected in corresponding various ways:

The anchoring element consists of at least two separate components, wherein, due to their geometry, the components are shifted relative to each other under the effect of the compressing force. Shifting occurs along surfaces that are neither parallel with nor perpendicular to the compression axis but extend obliquely relative to the latter. The anchoring element may be designed e.g. as a system of cones and/or wedges or as a system with a spreader element, which does not necessarily need to comprise thermoplastic material and e.g. is brought into the bore prior to the anchoring element component(s) comprising thermoplastic material. The enlargement of the cross sectional area is effected either by the shifting of the anchoring element components relative to each other (e.g. wedge system) or by shifting the anchoring element components relative to each other and simultaneously spreading them (e.g. cone system).

The anchoring element consists of at least two components linked via predetermined breaking points or predetermined liquefaction points, where the components are separated from each other when the compression force, and possibly also the mechanical vibrations are applied. The required enlargement of the cross sectional area is effected by shifting the anchoring element components relative to each other as described in the previous example.

A separate element is provided in the bore for exerting a force counteracting the compressing force, wherein this element includes a surface section which is oblique to the compression axis. The required local enlargement of the distance between the compression axis and the peripheral surface of the anchoring element is effected by shifting the anchoring element or a component thereof along the named surface, wherein the shifted component may or may not be spread.

The anchoring element consists of one piece and includes a section which is expandable by the compressing force. The anchoring element is e.g. shaped like a hollow truncated cone, a hollow wedge, a hat or a tube and advantageously includes slots to facilitate the expansion. The counterforce to the compressing force can be exerted by a surface perpendicular to the compression axis, or by a surface oblique to the compression axis. The latter case constitutes a combination with one of the three aforementioned embodiments.

The anchoring element includes at least one buckling location designed as a mechanically weak point (e.g. hole, slot, area of reduced wall thickness) or as a hinge. The local weak areas are softened during the anchoring procedure, causing anchoring element portions between the weak areas to tilt towards each other under the influence of the compressing force.

In other words: the compressing force can cause either just shifting of the anchoring element or of anchoring element components (e.g. wedge systems), or shifting in combination with deformation (e.g. multi-part anchoring elements with spreadable components) or just deformation (e.g. one-piece anchoring element able to buckle or to be expanded). Therein the shifting and/or the deformation can be supported by an appropriately shaped tool and/or by a separate auxiliary element. In the case of multi-part anchoring elements, it is advantageous to design component surfaces, along which the components are shifted relative to each other, thus that they are welded together during anchoring. In the case of anchoring elements or anchoring element components to be deformed, it is advantageous if the tensions caused by the deformation are resolved under the anchoring conditions.

In any embodiment the anchoring element or at least one of the anchoring element components may comprise an elastically pliant, e.g. metallic core; such a core may be formed as a metal sheet and comprise an edge which, during compression, is moved radially outwards and thereby cuts into the object, providing an additional anchoring.

"Oblique to the compression axis" means at an angle less than 90° and more than 0° relative to the compression axis. Advantageously the oblique surfaces form an angle between 20° and 70° with the anchoring element axis before anchoring.

Preferably, the anchoring element is free of tensions when anchored, i.e. there are no forces counteracting the deformation. This is achieved by the deformation occurring while the thermoplastic material is soft and re-solidifies when deformed.

For physical reasons there is a counterforce to any acting force. If the bore in the object is a blind hole, the counterforce can be exerted by the material of the object at the bottom of the bore. The invention according to its first aspect (as well as according to the second and according to the third aspect described below) however, is especially suited to situations, where it is not possible or not desirable that the object absorbs the compressing force (or synonymously, exerts the counterforce). In many relevant advantageous embodiments, the compressing force is imposed between a tool and a counter-element (retaining element). The counter-element is placed and held in such a position that it does not transmit force to the object but that the force is exerted e.g. by an apparatus or a person in charge of the anchoring procedure, by an assistant or by a suitable holder or other device or spring element etc.

A preferred embodiment of the anchoring element consists entirely of the thermoplastic material. It may however also comprise a non-liquefiable core and still be compressible, e.g. if the core comprises several telescopic sheaths.

A second aspect of the invention provides a method of anchoring an anchoring element in an object with the aid of a tool including a proximal side and a distal side, wherein the distal tool side includes a coupling-out face. The anchoring element comprises a coupling-in face through which the mechanical vibrations are coupled into the anchoring element and a material liquefiable by mechanical energy, which forms at least a part of the anchoring element surface. The coupling-out face of the tool is adapted to the coupling-in face of the anchoring element and enables the transmission of forces and mechanical vibrations out of the tool into the anchoring element. The method comprises the following steps:

providing a bore in the object;

positioning the anchoring element on the object such that thermoplastic areas of the anchoring element are in contact with the surface of the object;

coupling a force and mechanical vibrations via the coupling-in face into the positioned anchoring element, thereby liquefying at least part of the liquefiable material where it is in contact with walls of the bore and pressing it into the object in order to form a form-fit connection with the walls after re-solidification, wherein the force and the mechanical vibrations are coupled into the anchoring element with the aid of a tool, wherein a proximal tool side is designed for mechanical vibrations to be coupled into the tool and the distal tool side comprises a coupling-out face through which the mechanical vibrations are coupled into the anchoring element, and wherein either the force coupled into the tool is a tensile force (force in a direction from the distal tool side towards the proximal tool side) or a counter-element (retaining element) suitable for exerting a counterforce is provided by which counterforce the counter-element is put under tensile force.

The second aspect of the invention also provides a device for the application of the method. This device comprises an anchoring element suitable for being anchored in an object with the aid of mechanical vibrations as well as a tool (e.g. a sonotrode). The anchoring element includes a coupling-in face through which the mechanical vibrations are coupled into the anchoring element and a material liquefiable by mechanical energy, which forms at least a part of the anchoring element surface. The coupling-in face of the anchoring element is adapted to the coupling-out face of the tool. A coupling between the tool and the anchoring element is designed to withstand tensile force. The anchoring element is anchored in the bore with the aid of mechanical vibration and a pulling force (causing a tensile load in the tool), whereby the thermoplastic material is at least partly liquefied where in contact with the object and pressed into the object in order to form a form-fit connection with the object, when re-solidified.

Whereas according the state-of-the-art technology, a compression force (in a direction from the proximal tool side towards the distal tool side) is exerted on the tool for coupling a force into the anchoring element, according to the second aspect of the invention, a tensile force is exerted on the tool for coupling a force into the anchoring element. This very simple measure opens up a lot of new possibilities, some of which are outlined below:

Anchoring in places difficult to access: the second aspect of the invention allows, under certain circumstances, anchoring to be carried out from a non-accessible side.

Favoring a procedure which does not stress the material of the object: by applying a pulling force to the anchoring element and counteracting it with a simple counter-element—e.g. a simple perforated plate—practically all forces acting on the object can be eliminated.

Possibility of using newly developed anchoring elements and tools (sonotrodes).

For example, the coupling-out face of the tool faces "backwards", i.e. towards the proximal tool side. This is the case e.g. when the normal of the coupling-out face extends approximately parallel to the direction of the tensile force.

Alternatively, the anchoring element is drawn through the bore in the object, i.e. a pulling force is applied to the anchoring element and moves the anchoring element to a certain extent inside the bore.

Particularly advantageous is a combination of the first and the second aspect of the invention, i.e. the use of a compressible anchoring element according to the first aspect in a device according to the second aspect, which device is designed such that in action a tensile force acts on the tool.

According to a third aspect of the invention, the anchoring element is expanded by the tool, i.e. by causing the tool to move, in an axial direction, within the anchoring element and thereby locally expand it in a lateral direction, thereby causing the lateral walls of the anchoring element to be pressed against walls of a bore in the construction material object.

The third aspect of the invention, accordingly provides a method of anchoring an anchoring element in an object of construction material with the aid of mechanical vibrations using a tool. The anchoring element comprises an axis and a material liquefiable by mechanical vibrations, which forms at least a part of the surface of the anchoring element, the method comprising the steps of:

providing a bore in the object;
positioning the anchoring element in the bore;
providing a tool having a proximal portion and a distal end portion;
positioning the tool in contact with to the anchoring element;
coupling the mechanical vibrations into the tool and simultaneously moving the tool relative to the anchoring element in axial direction, a portion of the tool moving in an interior of the anchoring element, and thereby expanding the anchoring element and pressing the anchoring element at least locally against lateral walls of the bore and, due to the expansion and the effect of mechanical vibrations coupled into the anchoring element from the tool, liquefying the thermoplastic material at least partly where in contact with the wall of the bore to yield liquefied thermoplastic material, and pressing the liquefied material into the construction material in order to form a positive-fit connection with the wall after re-solidification.

This means that the third aspect of the invention is based on the fact that, with the aid of the tool, the thermoplastic material is liquefied or plastified in a peripheral region of the anchoring element and advantageously also in the area of the axially extending recess and is pressed radially outward. As with the procedure according to the first aspect, with this procedure too an anchoring is achieved by means of interpenetration of object structures in a lateral wall of the bore in the object. Relevant advantages and freedom of design of the first aspect of the invention also apply to the third aspect of the invention.

According to a preferred embodiment of the third aspect of the invention the anchoring element consists entirely of the thermoplastic material.

Particularly advantageous is a combination of the second aspect of the invention and the third aspect, i.e. a procedure according to the teaching of the third aspect, wherein the force is coupled into the tool as a tensile force.

According to a further embodiment of the third aspect of the invention, the anchoring element is expanded by the tool and therefore pressed against the lateral walls of the bore, is not anchored in these lateral walls by means of a liquefied material, but by other means, e.g. by surface structures acting like barbs.

In embodiments of any one of the three aspects of the invention, the tool may, after anchoring, be removed, or it may remain in place and, for example, be affixed to the anchoring element by re-solidified material that was at least partly liquefied during anchoring. In the latter cases, the tool may, after anchoring, serve as a functional part of the anchoring element. It may, for example, be used in a load bearing manner and may comprise means for affixing a further element to it such as a structure for forming a positive fit connection (such as a threading, a bayonet fixing, an eyelet, or a structure which an other element may be glued or welded or soldered etc.) or a fastener head pressing or other protuberance pressing the further element onto the object etc.

In embodiments where the tool remains in place and is affixed to the anchoring element, the tool (being a sonotrode during anchoring) may have the function of a fastener, such as a 'screw', a 'nail', a fastening pin, a fastening bolt etc, whereas the anchoring element itself may be viewed as a kind of "dowel" for the fastener. The invention, according to a further aspect, thus most generally discloses the principle of fastening a fastener to an object of construction material, the method comprising the steps of:

bringing an anchoring element comprising thermoplastic material in contact with the object,
bringing the fastener in contact with the anchoring element,
coupling mechanical oscillations into the fastener and causing them to be transferred from the fastener into the anchoring element, and at the same time coupling a translation force into the fastener and causing this translation force to act upon the anchoring element,
the joint action of the mechanical oscillations and of the force causing at least a portion of the thermoplastic material to melt in contact with the object of construction material and in a bore thereof (the bore being pre-made or being produced by the joint action of the mechanical oscillations and the force), and
during the coupling of mechanical oscillations, fixing the fastener to the anchoring element.

The fixing of the fastener to the anchoring element may be done by the effect of the joint action of the mechanical oscillations and of the force, for example causing the anchoring element to be welded to the fastener and/or by other positive fit connection means such as barb like structures of the fastener etc. The fastener is at least partially made of material not liquefiable by the mechanical oscillations, such as a metal or hard plastics.

The principle of this further aspect is preferably combined with any one of the three above described aspects of the invention. The combination of this further principle with the three aspects is especially preferred since the three aspects all show ways of having the tool reach into the anchoring element or through the anchoring element during anchoring (instead of just having it impinge on a proximal face of the anchoring element). Also, the three aspects of the invention (and combinations thereof) show, as discussed, ways of affixing the anchoring element to especially brittle or weak construction material objects such as plasterboards, boards of cardboard etc., and they are especially suited for embodiments where the anchoring element as a whole remains "below" (distal of) a surface of the construction material object. In such embodiments, the tool/fastener may, after anchoring, optionally protrude above said surface.

Preferred embodiments of any one of the three aspects may comprise the additional feature of automatically applying, by means of a spring element or an other suitable mechanism, the force acting on the anchoring element during anchoring. For example, the spring element may be arranged so as to exert a well-defined spring force between the anchoring element and a counter element (retaining element). This features the advantage, that the force necessary for successful anchoring can be pre-defined, and success of the anchoring process does not only depend on the skills professional applying the method, and the professional does not need to use force—if many anchoring elements are placed, the method is less exhausting. The variant with the spring element causing the acting force is especially advantageous in combination with the second aspect of the invention, since a spring can be placed between a construction material object surface (or a counter element placed in contact with the object surface) and a proximal portion of the tool or an object connected to the proximal end of the tool, so that the tool is, by the spring force, drawn towards the proximal side, and both, the force and the positions of the tool before and after anchoring may be predefined.

In embodiments that feature automatically applying the acting force, as well as in other embodiments where the force is applied manually, there may optionally be a stop defining the travel of the tool during anchoring.

Subjects of the invention are also sets of items for carrying out the method according to one of the three aspects of the invention. Such a set includes at least one tool (e.g. sonotrode) as well as one or advantageously a plurality of anchoring elements. In addition, the set may include a device for generating the mechanical vibrations, instructions for the anchoring, a counter-element, a separate element with an oblique surface area as discussed above and/or further items.

BRIEF DESCRIPTION OF THE DRAWINGS

In the following, embodiments of the invention are described in connection with the following Figs., wherein same reference numerals are used for same or equivalent elements. Therein:

FIGS. 1a and 1b illustrate a first embodiment of the invention according to its first aspect;

FIGS. 2a and 2b show a sectional view of the embodiment according to FIGS. 1a and 1b in a bore in the object to illustrate its function;

FIGS. 3a to 3c are sectional views of further embodiments of the invention according to its first aspect;

FIGS. 8a and 8b show a further embodiment of the invention according to its first aspect;

FIG. 9 shows a further embodiment of the invention according to its first aspect;

FIG. 10 shows an embodiment of the invention according to its first aspect, wherein the anchoring element comprises a non-liquefiable core;

FIG. 11 shows a further embodiment of the invention;

DETAILED DESCRIPTION OF THE INVENTION

Figure 3C:
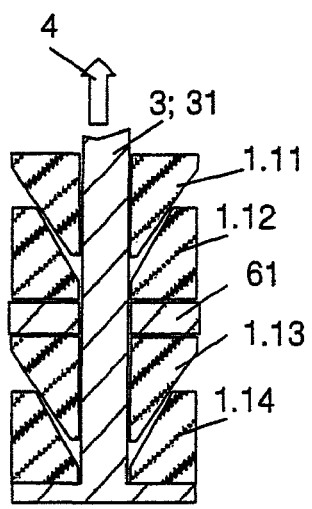

The anchoring element 1 according to FIG. 1a is a first example of an anchoring element according to the first aspect of the invention which is suitable as a coupling sleeve for attaching a fitting on the object. The anchoring element is essentially tubular, consists of a thermoplastic material, and comprises a proximal end face 1.1 and a distal end face 1.2. The anchoring element further comprises at least one slot 12 extending approximately parallel to the axis 11 of the anchoring element; advantageously there are two, three or more than three slots arranged approximately equidistantly. Due to the slot or slots 12 the anchoring element is compressible by a compressing force 4 acting parallel to its axis (according to FIG. 1a, the axis 11 of the tubular anchoring element is also its compression axis). The anchoring element is depicted in a compressed state in FIG. 1b.

It is obvious that for achieving the desired compression a force must act upon the anchoring element from two opposite sides ("force and counterforce"), wherein the counterforce is often exerted by a stop face. In the embodiment according to FIGS. 1a and 1b compressing forces are exerted upon the proximal end face 1.1 and the distal end face 1.2. In the following description however, a force is illustrated only where a tool is in action. To the expert, it is obvious that a counterforce must exist in order to achieve the desired effect.

According to the invention, the anchoring element is designed such that its compression results in a local enlargement of the distance between the peripheral surface of the anchoring element and the compression axis 11, here, a local enlargement of the exterior cross-section perpendicular to the compression axis 11. The enlargement can occur anywhere between the proximal end face 1.1 and the distal end face 1.2. In the example according to FIGS. 1a and 1b, the enlargement is, due to the symmetry of the anchoring element, greatest in the middle between the end faces. In FIGS. 1a and 1b, the diameter of the outer cross section—this also incorporates the cavity within the anchoring element—is indicated at the point of the largest cross section by c in the non-compressed condition, by c' in the compressed condition. Through the compression the slots 12 become wider.

For anchoring the anchoring element 1 is placed in a bore 21.1 in the object 21. As illustrated in FIG. 2a this bore can be a blind bore. Alternatively, the bore is tunnel-shaped, i.e. reaches through the object (for more detail see further below). In particular the bore can be of a cylindrical shape, which is easy to make. The diameter of the bore is at least equal to the diameter c of the original outer cross section and may be slightly larger, as shown in FIG. 2a.

When the anchoring element is positioned in the bore 21.1, a force 4 is exerted along its compression axis 11 and mechanical vibrations 5 are coupled into the anchoring element while the force 4 is active. This is achieved with the aid of a tool 3 comprising a coupling-out face 3.1, which collaborates with a coupling-in face of the anchoring element. In the illustrated example, the coupling-in face corresponds with and is identical with the proximal end face 1.1. The coupling-out face 3.1 can completely cover the coupling-in face and the interior cavity of the anchoring element 1, as shown, but it can also be ring-shaped and exactly adapted to the proximal end face 1.1. The tool 3 is effectively connected on its proximal side 3.2 with a vibratory device (not shown). Such devices are generally known and have been referred to e.g. in WO02/069817.

FIG. 2b shows the anchoring element 1 after application of the compressing force and the vibrations. Due to the compressing force 4 the cross-section of the anchoring element is enlarged, as illustrated in FIG. 1b. As soon as the anchoring element engages in areas of the cross-section enlargement with the lateral wall of the bore, the compressing force 4 produces a pressure upon the lateral walls. There, the vibrations cause friction and the thermoplastic material is locally liquefied and pressed into pores or other cavities in the material of the object. This effect is indicated by horizontal arrows in FIG. 2b. Of course, the same also occurs in the area of the distal end face of the anchoring element.

Once a predetermined compression is achieved, the vibrations are switched off and/or the tool 3 is removed. The liquefied thermoplastic material re-solidifies and creates an anchoring of the anchoring element 1 through a form-fit connection with the structures of the lateral wall.

The method of anchoring the anchoring element with the aid of thermoplastic material which is liquefied and in the liquefied state penetrates into cavities (pores, other cavities of small dimensions when compared with the bore provided in the object for the anchoring element), which method is illustrated in FIG. 2b, is shared by all the embodiments of the invention. In each following Fig. this effect is illustrated by arrows indicating the direction in which the thermoplastic material penetrates into the cavities.

Preferably but not necessarily, as in all embodiments according to the first aspect of the invention, the thermoplastic material of the anchoring element is heated during the anchoring procedure to such an extent that it is free of tension after the anchoring procedure, i.e. no force counteracting the deformation of the anchoring element remains. In this case, the compressing force and the mechanical vibrations can be stopped simultaneously as the anchoring element does not relax neither before nor after re-solidification.

The anchoring element 1 according to FIG. 3a comprises a plurality of components. The illustrated example consists of three components 1.11, 1.12, 1.13, which are approximately rotationally symmetrical with regard to any rotation angle around its axis, which also corresponds with the compression axis 11. The first component 1.11 (seen from the distal side) has essentially the shape of a truncated cone and comprises an axial bore through it. The second component 1.12 has essentially the shape of a hat, here with a central axial bore. The hat-like design defines an interior surface 1.12a and an exterior surface 1.12b. The third component 1.13 has the shape of a cylinder and comprises a coaxial conical cavity and an axial bore. The central bores of the first, second and third component are coaxial to each other and of approximately the same diameter.

If applicable and deviating from the rotational symmetry, at least the central component 1.12, but possibly also the third component 1.13 and the first component 1.11, are advantageously slotted, which is not shown in FIG. 3a. Because of the slot(s) the relevant components are easily spreadable and the anchoring element as a whole can be compressed along the compression axis by a relatively moderate compressing force. As the compressing force 4 is applied the components 1.11, 1.12, 1.13 are shifted relative to each other along surfaces extending obliquely (i.e. at an angle neither parallel nor perpendicular) to the compressing force. In the illustrated embodiment the named surfaces have the form of truncated cone shells, i.e. they are conical. There are other surfaces also which have a spreading effect.

In the illustrated embodiment the opening angle of the exterior surface 1.11a of the first component 1.11 is larger than the opening angle of the interior surface 1.12a of the second component 1.12 and the opening angle of the exterior surface 1.12b of the second component 1.12 is larger than the opening angle of the interior surface 1.13a of the third component. Advantageous for the spreading effect in the present configuration is that at least one opening angle of an exterior surface is greater than the opening angle of an interior surface, into which the exterior surface reaches.

When the anchoring element is positioned in the bore—the diameter of the bore approximately corresponds with the outer diameter of the anchoring element components 1.11, 1.12, 1.13 before compression—and when the compressing force and mechanical vibrations are applied, the following takes place:

Due to the compressing force the second and the third component 1.12, 1.13 are spread, resulting in an enlargement of the outer cross sectional area of the second and third component and thus of the whole anchoring element.

Due to the spreading, outer surfaces of the second and third component 1.12, 1.13 are pressed against the lateral wall of the bore. Due to the mechanical vibrations the thermoplastic material liquefies in these surface areas and interpenetrates the pores (or other cavities) in the material of the object 21.

The vibrations also result in frictional forces between the surfaces 1.11a, 1.12a, 1.12b, 1.13a which cause the thermoplastic material to liquefy, which in turn results in the first, second and third components being welded together.

The proximal end face 1.1 or alternatively, the distal end face 1.2 of the anchoring element according to FIG. 3a can serve as a coupling-in face. The proximal and the distal side of the anchoring element can be exchanged (i.e. the anchoring element can be used "back to front").

FIG. 3b shows a further embodiment of the anchoring element according to the invention, which anchoring element is, regarding compression and anchoring, very similar to the embodiment according to FIG. 3a. Same elements are designated with same reference numerals. The anchoring element is a multi-part anchoring element and consists of any chosen number (e.g. three as shown) of identical components, all designed for being spread (e.g. hollow cones or hollow wedges) and loosely positioned inside one another. The compressing force 4 pushes the spreadable components together and spreads them. If need be, the distal end portion of a tool to be used is designed as a spreading element, as illustrated in FIG. 11. In the embodiment according to FIG. 3b, all surfaces oblique to the compression axis, along which the anchoring element components are shifted in relation to each other, may be parallel (identical opening angles), as illustrated in FIG. 11. This has the advantage that the size of the anchoring element can be determined by the chosen number of identical components.

The embodiment according to FIG. 3c is based on the embodiment according to FIG. 3a. Unlike that embodiment however, the anchoring element consists of a plurality of modules (illustrated: two modules) each of which comprises at least one component 1.11, 1.12, 1.13, 1.14 (illustrated: two components per module). There is a spacer element 61 between the modules, e.g. a metallic ring as illustrated, which does not need to be of thermoplastic material. This embodiment is suitable for being anchored at two or more locations in a lateral wall of the bore in the object. The distance between these locations is determined by the spacer element. Such anchoring element embodiments comprising two modules are advantageously used in combination with a tool 3 or counter-element 31, whose function is discussed in more detail below. As shown in FIG. 3c, the tool or counter-element 3; 31 comprises a shaft penetrating a central recess of the anchoring element. Other guiding means for guiding the spacer element are conceivable.

In addition to the embodiments illustrated in FIGS. 3a, 3b and 3c the following embodiments (besides many others) are conceivable:

Each component may comprise a non-liquefiable core, the core of the second and third component being elastically or plastically deformable. The core, which e.g. consists of metal or a metal alloy, may constitute a substantial part of the cross-section and form the load-bearing part of the anchoring element.

The first component 1.11 does not necessarily need to comprise thermoplastic material.

The first component may be removable after anchoring (in which case it is not part of the anchoring element but e.g. part of the tool or a separate element).

An equivalent embodiment comprises instead of three components only two components (e.g. no central component 1.12) or four or more than four components (e.g. further hat-shaped components similar to the central component 1.12).

The shapes of the components may be varied, wherein it is necessary to provide some surfaces oblique to the compression axis, along which surfaces the components can be shifted relative to each other.

The components do not need to be approximately rotationally symmetrical. The central bore may be omitted.

The components may be linked prior to the anchoring via predetermined breaking points, which will be discussed in more detail below.

The components do not need to be hat-shaped and able to be spread, but may be laterally displaceable relative to each other, which is also described in more detail below.

For a selective liquefaction of thermoplastic material in a desired location, at least one energy director may be provided along the periphery of at least one component.

The embodiments according to FIGS. 3a to 3c, the same as the embodiments according to the first aspect of the invention as described below, may comprise a ductile core of a material, which, under anchoring conditions, is non-liquefiable. At least the anchoring elements with components which have the shape of hats or hollow wedges can e.g. be made of sheet metal which is slotted and coated with thermoplastic material, wherein the metal sheet may protrude radially from the anchoring element component. During compression the metal sheet is spread and cuts e.g. into the object through the lateral wall of the bore. The anchoring element may be additionally furnished with elements acting like barbs. The cutting effect of the metal sheet provides an additional anchoring.

Any chosen combinations of the named embodiments are possible.

Figure 4:
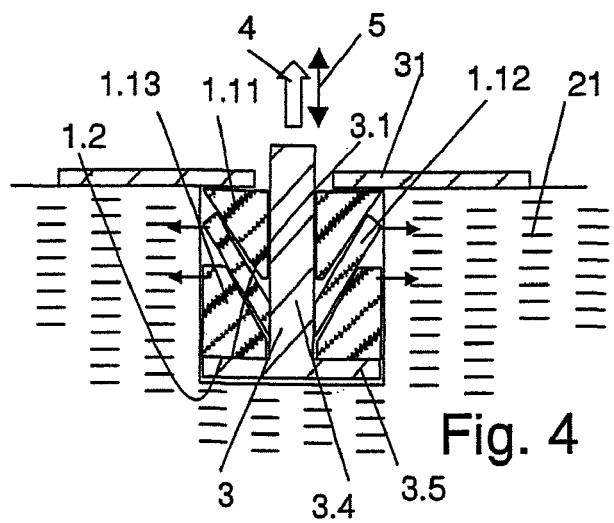
FIG. 4 is a sectional view of the embodiment according to FIG. 3a in a configuration which also corresponds with the second aspect of the invention.

In FIG. 4 the anchoring element 1 according to FIG. 3 is shown in a configuration corresponding with the second aspect of the invention. In this configuration no force is exerted on the object on the bottom of the bore. The vibrations and the compressing force acting upon the anchoring element are coupled into the anchoring element from a tool 3 which is under tensile force. The configuration according to FIG. 4 is therefore also suitable for applications in bores leading tunnel-like through the object.

The tool 3—as it serves among other things to couple vibrations from a vibratory device (not illustrated) into the anchoring element, can also be called a "sonotrode"—and comprises a shaft 3.4 and a base plate 3.5. The coupling-out face 3.1 of the tool is the surface of the base plate 3.5 facing towards the proximal tool side. The shaft 3.4 extends through the central bore of the anchoring element components 1.11, 1.12, 1.13 and protrudes from the proximal end of the anchoring element and from the bore in the object. The proximal tool end is designed for being coupled to a vibratory device, which coupling is to be suitable for transmitting a tensile force.

During the anchoring procedure a tensile force is applied to the tool 3 (force 4) and mechanical vibrations 5 are coupled into it. From the tool, force 4—as compressing force—and the mechanical vibrations are coupled into the anchoring element. A counter-element 31 prevents the anchoring element from simply moving out of the bore in the object. In the illustrated example, the counter-element 31 is designed as a plate.

Following the anchoring procedure, the tool 3 can be dealt with in various ways:

The tool can remain in the place of the anchoring. This embodiment is particularly advantageous when the tool is designed for a further function. Thus the tool can serve e.g. for attaching a further element on the anchoring element.

If the bore in the object is a through-going bore, the tool can be separated from the vibratory device and be removed from the distal side of the anchoring element.

The tool can be removed from the proximal side. In this case the tool and the through-going recess in the anchoring element, through which the shaft 3.4 extends during the anchoring procedure, must not be of a round cross section (no rotational symmetrical with regard to random rotation angles). Corresponding openings in the anchoring element will be discussed in more detail below.

Like the anchoring elements according to FIGS. 1 and 3, the anchoring elements according to FIGS. 5 to 10 are designed according to the first aspect of the invention and can be used together with a suitable tool in a configuration according to the second aspect of the invention.

Figure 5:
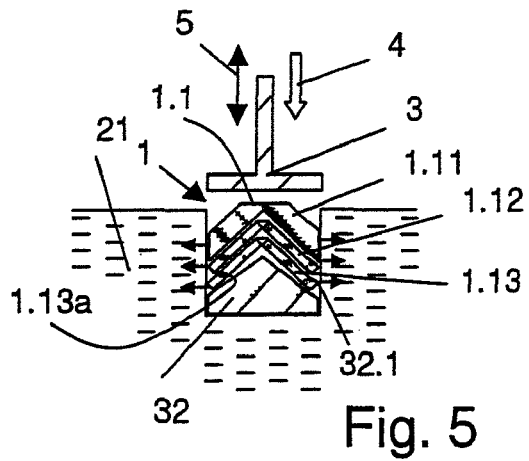
FIG. 5 is a sectional view of a further embodiment of an anchoring element in a bore in the object.

The anchoring element 1 according to FIG. 5 comprises, like the one according to FIG. 3, a plurality of components 1.11, 1.12, 1.13, which are designed for being shifted relative to each other along surfaces that extend obliquely (i.e. at an angle or neither parallel nor perpendicular) to the compressing force. The components can be designed just like the anchoring element components—in particular the second and/or third component—of the embodiment according to FIG. 3 and its variants and are therefore not described in detail again. In contrast to the embodiment according to FIG. 3, a separate spreading element 32 is used, wherein the spreading element does not need to comprise thermoplastic material. As illustrated, the spreading element is placed on the bottom of the bore in the object 21 before the anchoring element is introduced. The spreading element comprises at least one shifting surface 32.1, which is oblique relative to the compression axis and forms an angle with the latter which is greater than the opening angle of the corresponding interior surface 1.13a of the anchoring element. The components 1.11, 1.12, 1.13 are spread by the compressing force 4 due to the effect of the spreading element and in the area of their circumference are pressed against the lateral wall of the bore in the object. During the anchoring procedure the spreading element can be welded to the components 1.11, 1.12, 1.13 comprising thermoplastic material, thus becoming part of the anchoring element. Depending on the surface properties the spreading element may also remain separate. In the illustrated configuration the spreading element remains in the bore in the object where it may or may not have another function. In other configurations it may be removable from the bore.

The spreading element—whether or not it comprises material liquefiable during the anchoring process—may optionally be configured to be connected to the anchoring element 1—and to become part of it—during anchoring, for example by welding and/or by other means of forming a connection.

The following embodiments are conceivable in addition to the previously described embodiments:

Instead of three components there may be a single component, two components or four or more components, comprising thermoplastic material at least in a peripheral region.

The anchoring element may also be placed the other way round, provided that the spreading element is correspondingly adapted.

Combinations with the variants as described in connection with the embodiment of FIG. 3 are possible.

Figure 5A:
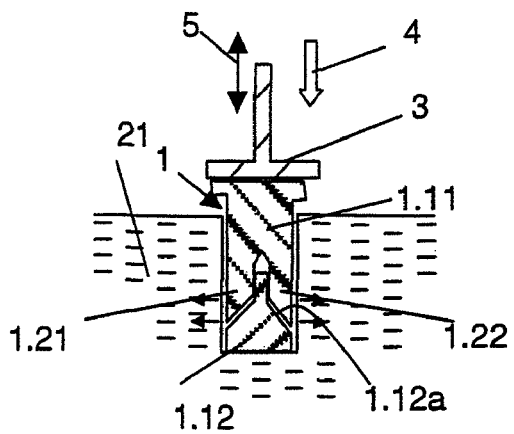
FIG. 5a is a sectional view of an even further embodiment of an anchoring element in a bore in the object.

FIG. 5a shows a variant of the embodiment of FIG. 5. It differs in that the spreading element 1.12—being a second part of the anchoring element—is made of thermoplastics and is welded together with the first anchoring element part 1.11 during the anchoring process. The first anchoring element part 1.11 comprises two legs 1.21, 1.22 that are spread apart by the spreading element 1.12.

The depicted first anchoring element part 1.11 further comprises, at its proximal end, a thermoplastic anchoring element head with a larger cross section than a main portion of the anchoring element.

Of course, also combinations of the approaches of FIGS. 5 and 5a are possible, for example a first anchoring element part with two legs 1.21, 1.22 to be spread apart may be combined with a spreading element of not thermoplastic material, or a spreading element 1.12 of thermoplastic material may be combined with a first anchoring element part with a slitted hat-like distal end portion etc.

Figure 6:
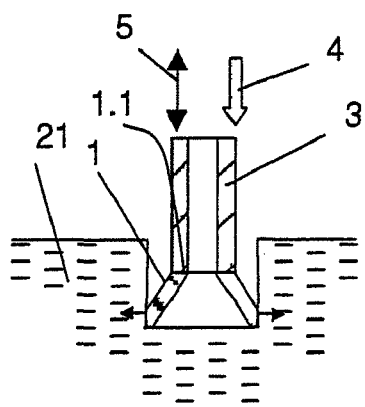
FIG. 6 is a sectional view of a further embodiment of the invention according to its first aspect.

FIG. 6 shows yet another variant of the embodiment according to FIG. 5. This differs from the latter by not comprising a separate (spreading) element with a surface section oblique to the compression axis. Instead, spreading is achieved by the shape of the anchoring element 1 and by the anchoring element being pushed against an e.g. level surface perpendicular to the compression axis, which may be the bottom of the bore in the object as illustrated, or the surface of a separate element. In the illustrated example the anchoring element is hat-shaped and the compressing force 4 squeezes the edges outwards, thus pressing them against the lateral walls of the bore. Advantageously the hat-shaped anchoring element comprises a slot or a plurality of slots as described further above. Variants with other spreadable shapes (e.g. hollow wedge) are also conceivable.

FIG. 6 moreover illustrates, that the tool 3 can be of a specific shape adapted to the coupling-in face 1.1—here, at least on the distal side, tubular. Such a specific shape enables an energy-efficient coupling of mechanical vibrations into the anchoring element.

Figure 7:
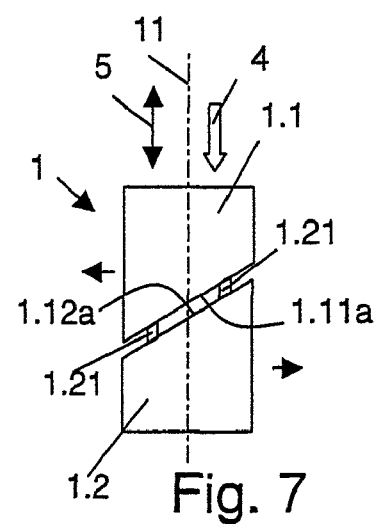
FIG. 7 illustrates the functional characteristics of a further group of embodiments.

The embodiment of the anchoring element 1 according to FIG. 7 comprises two components. A first proximal component 1.11 is connected to the second distal component 1.12 by connecting fins 1.21, which are thin compared to the dimensions of the anchoring element. During compression of the anchoring element the fins 1.21 break or melt, i.e. they represent predetermined breaking or melting points. The first component 1.11 and the second component 1.12 are wedge-shaped, each comprising a ramp 1.11a and 1.12a which ramps slide sideways along each other when the components are pressed against each other by a compressing force acting along the compression axis 11.

After disintegration of the connecting fins 1.21, the anchoring element components 1.11, 1.12 are shifted relative to each other under the influence of the compressing force. The embodiment according to FIG. 7 is therefore a further example of an anchoring element comprising a plurality of components 1.11, 1.12, movable relative to each other along surfaces (i.e. ramps) extending obliquely to the compression force. In this embodiment too, an outer diameter of the anchoring element is enlarged by the lateral shift caused by the compressing force.

Connections like the connecting fins 1.21 serving as predetermined breaking or melting points can, as already mentioned, also be applied in the multi-part embodiments discussed further above.

The design of the shifting surfaces oblique to the compression axis 11 as ramps—with or without connections between the components—may also be combined with the characteristics of the embodiments of FIGS. 3 and 5.

In particular, one of the anchoring element components may be replaced by a separate element which does not need to comprise thermoplastic material and functions in an analogous manner as the spreading element according to FIG. 5.

Alternatively to the illustrated embodiment, an anchoring element according to FIG. 7 can also be designed to be thermoplastic and essentially cylindrical (e.g. circular cylinder) with horizontal (i.e. perpendicular to the cylinder axis) or oblique incisions, which do not reach right through the anchoring element but leave areas of a reduced cross section. These serve as predetermined breaking or melting points. Such an embodiment may be advantageous with regard to production.

FIG. 8a shows a further embodiment of an anchoring element 1 according to the invention. In this embodiment, as opposed to the previously described embodiments, the local enlargement of the distance between a peripheral surface and the compression axis is not necessarily due to an enlargement of the exterior cross sectional area. In this and other similar examples however, at least the projection of the exterior surface along the compression axis is enlarged.

The anchoring element is essentially pin-shaped, but comprises lateral incisions 14, 15 and corresponding contractions 1.4, 1.5. During anchoring, these contractions function as predetermined melting points. As they melt or at least soften due to the effect of the mechanical vibrations, the compressing force tilts the anchoring element sections between the contractions towards each other, thus effecting the local enlargement of the distance between the peripheral anchoring element surface and the compression axis, as shown in FIG. 8b, which illustrates schematically the shape of the anchoring element after anchoring. The regions being pressed against the lateral walls of the bore in the object are indicated by horizontal arrows.

Alternatively, the anchoring element may comprise just one contraction 14, or two contractions (or possibly more than two contractions) with differing cross-sections. In particular the anchoring element may comprise a wider contraction closer to the coupling-in face. This can result in the contraction further removed from the coupling-in face liquefying before the contraction closer to the coupling-in face and may prevent the contraction closer to the coupling-in face from melting before the other contraction, which would inhibit further transmission of mechanical vibrations to this other contraction.

FIG. 9 shows an embodiment of an anchoring element 1 according to the invention designed in the manner of an accordion, wherein portions 1.31 linked by hinges 1.32 are moved into a steeper position in relation to the compression axis 11 under the influence of the compressing force 4. Thereby the outer cross-section of the anchoring element is enlarged locally. In the illustrated embodiment the whole anchoring element 1 is a single unit, so that the hinges 1.32 are created simply by the shape of the anchoring element body; the use of other hinging means is possible. In certain circumstances measures can be taken to enable mechanical vibrations to be transmitted to the areas further removed from the coupling-in face. Such measures are e.g. the provision of a non-liquefiable core of superior rigidity compared to the thermoplastic material.

Such a core is shown in FIG. 10 in an embodiment similar to the one of FIG. 3. Elements equivalent to the corresponding elements of the embodiment according to FIG. 3 are not again described in detail. The core comprises two core components 41, 42, which are moveable against each other. The first core component 42 comprises in the illustrated embodiment a base plate 42.2 and an adjoining sheath-like section 42.1. The exterior or interior surface of the base plate 42.2 can serve as a coupling-in face for the mechanical vibrations. The second core component 41 is here designed as a sheath moveable inside the sheath-like section 42.1 of the first core component. While the anchoring element is compressed one core component slides inside the other.

Alternatively to the two-part core, one-piece cores or multi-part cores are also possible. A one-piece core does not extend across the entire length (relating to the compression axis 11) of the anchoring element, because that would render a compression of the anchoring element impossible.

FIG. 11 shows a configuration with a compressible anchoring element 1 according to the invention of the kind described in connection with FIG. 5. In contrast to the latter, there is no separate spreading element but the tool 3 comprises a wedge- or ramp-like coupling-out face 3.1 that is formed by a distal end portion 3.7 being larger in diameter than a shaft portion 3.4. The wedge- or ramp-like coupling-out face 3.1 serves to couple mechanical vibrations and the compressing force into the anchoring element as well as to spread the anchoring element.

In the configuration illustrated in FIG. 11, moreover, the principle of the tool 3 under tensile force is applied. The configuration according to FIG. 11 is therefore also suitable for use in bores with a bottom which is not suitable to be loaded or in a through-going bore (tunnel) as illustrated in FIG. 11.

The principle of coupling a force into the anchoring element which puts the tool under tensile loading corresponds with the second aspect of the invention. This principle can also be applied in connection with anchoring elements which are not compressed by the named force. Such configurations are described in connection with the following FIGS. 12 to 16.

Figure 12A:
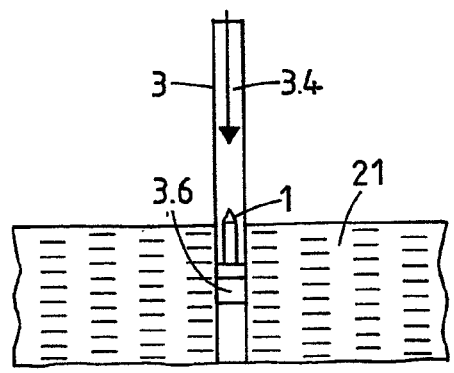
FIGS. 12a to 12d illustrate the principle of a device and of a method according to the second aspect of the invention.
Figure 12B:
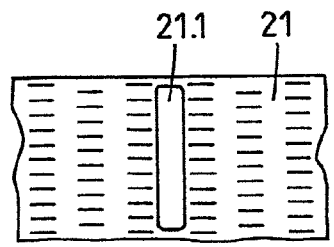

FIGS. 12a and 12b show, in section and viewed from the top, an object 21 comprising a slot-shaped (not round) bore 21.1 reaching tunnel-like from one surface to the opposite one. FIG. 12a also shows a tool 3 with a shaft 3.4 and a reach-out portion. In the illustrated embodiment the reach-out portion is a traverse 3.6 oriented perpendicular to the shaft. Two anchoring elements of thermoplastic material—possibly with a solid non-thermoplastic core—are fixed to the traverse 3.6 in a reversible manner.

Figure 12C:
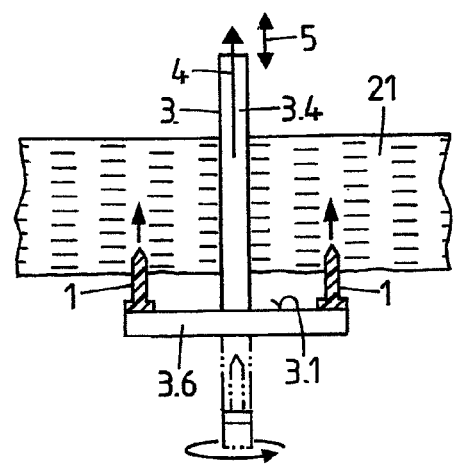

As illustrated in FIG. 12a the tool 3 with the anchoring elements attached thereto is moved in a first step from a proximal side of the object through the bore until the anchoring elements 1 are completely outside the object (i.e. on the distal side of the object). Subsequently, as shown in FIG. 12c, the tool is rotated around an axis defined by its shaft 3.4, e.g. by 90°. Then, as in the previously described embodiments, a force is coupled into the anchoring elements pressing the thermoplastic material of the anchoring elements against the object. This is achieved by pulling the tool backwards, thereby pressing the anchoring elements against the rear side of the object. While the force is acting upon the anchoring elements, mechanical vibrations are coupled into the anchoring element via the coupling-out face 3.1 of the tool, which is here provided by the proximal surfaces of the traverse upon which the anchoring elements are fixed. This causes the thermoplastic material of the anchoring elements to partly liquefy and to be pressed into the object. After stopping the mechanical vibrations, the thermoplastic material re-solidifies and forms a form-fit connection with the object.

Figure 12D:
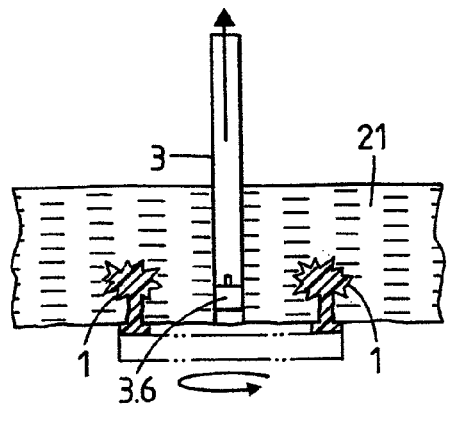

As shown in FIG. 12d the tool is subsequently removed by being detached from the anchoring elements now anchored in the object by a gentle push. Then it is turned back into the orientation in which the reach-out section fits through the bore 21.1 and retracted. Alternatively to the illustrated embodiment, it is also possible that the tool is left in the object after anchoring and there e.g. assumes another function. It is also possible to remove just a part of the tool, e.g. the shaft, while another part, e.g. the reach-out portion, remains and assumes a further function. In such a case the tool is not a single unit but shaft and reach-out portion are attached to each other in a reversible manner, e.g. by being screwed together.

The embodiment of the invention, shown in FIGS. 12a to 12d, is also suitable for connecting from "behind", i.e. from a side not easily accessible, two pieces to form an object, wherein the two pieces, prior to the anchoring, are completely separated from each other or connected only by a weak link. In such a case the tool is not introduced through a bore as illustrated in FIG. 1b but through the gap between the two pieces. The reach-out portion of the tool remains in place after the anchoring and serves as a bridge connecting the two pieces of the object in a rigid manner.

In the illustrated embodiment no openings are provided in the object for positioning the anchoring elements prior to the application of the mechanical vibrations. The bore 21.1 in the object merely serves for positioning the tool. The anchoring elements are driven into the object by a force exerted upon them, wherein an anchoring element tip and/or axially extending cutting edges, advantageously not consisting of the liquefiable material, support penetration of the anchoring element into the object.

The force for driving the anchoring elements into the material of the object (e.g. wood or similar material) can e.g. be applied before the mechanical vibrations. Alternatively to the illustrated configuration, it is also possible to provide openings in the object, wherein the diameter of these openings may be smaller than the diameter of the anchoring elements.

The following variants are possible:

Instead of with two anchoring elements as illustrated, the method can also be performed with just a single anchoring element or with more than two anchoring elements.

The reach-out portion of the tool can have any shape optimized for its function as well as for the transmission of vibrations and force.

Depending on circumstances the tool with the anchoring elements can be introduced from behind (i.e. from the distal side) so that only the shaft has to be moved through the bore.

Figure 13:
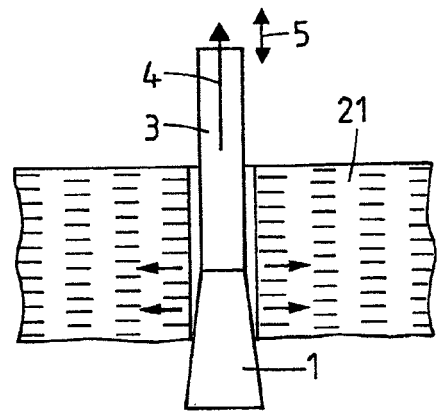
FIGS. 13, 14a, 14b show further embodiments according to the second aspect of the invention.

FIG. 13 shows a further embodiment of the invention. A through-going bore having a constant cross section (e.g. a through-bore with a round cross section) is provided in the object 21. An anchoring element 1 tapering from the distal side to the proximal side is introduced from behind, i.e. from the distal side into the bore. The anchoring element is drawn into the bore with the aid of the tool 3, which engages the proximal side of the anchoring element, wherein a tensile force acts on the tool (the tool is under tensile loading). While the tensile force is kept active the mechanical vibrations are coupled into the anchoring element. The vibrations and the slightly tapering shape of the anchoring element cause the thermoplastic material in the area of the circumferential surface of the anchoring element to be liquefied and to be pressed into pores or other cavities on the lateral walls of the bore in the object.

In this embodiment, where tensile forces not only impinge on the tool but also on the anchoring element, it is necessary to connect the tool and the anchoring element rigidly, as described in more detail below.

As an—often less preferred—variant, the bore may taper toward the proximal side while the anchoring element is (rotationally) cylindrical.

As a further variant the bore in the object can be stepped, wherein it is wider on the distal side than on the proximal side. The corresponding anchoring element may comprise a shoulder engaging the step of the bore during the anchoring procedure. Further embodiments of anchoring elements, which can be anchored by means of a pulling force, are conceivable.

Figure 14A:
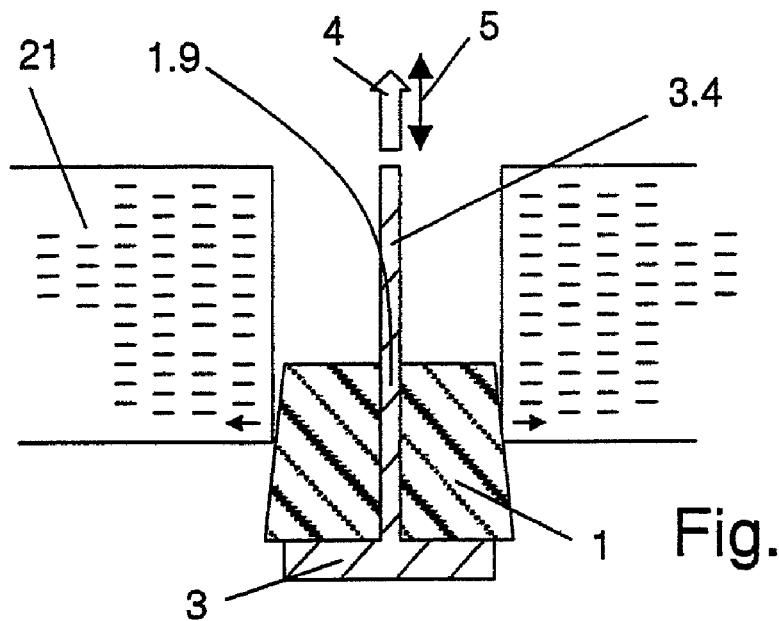

FIG. 14a shows a configuration with a slightly conical anchoring element 1 being moved, like the anchoring element according to FIG. 13, with the aid of a tool 3 along an axis of the bore in the object, wherein the force to be coupled into the anchoring element puts the tool under tensile loading, i.e. the force acting on the anchoring element is directed against the oscillation generator. However, in contrast to the configuration according to FIG. 13 the force upon the anchoring element 1 is a pressure force (i.e. pushing force). To this end the anchoring element comprises a central bore 1.9, which in the illustrated configuration extends parallel to the axis of the bore in the object during the anchoring procedure. A tool shaft 3.4 carrying a base plate 3.5 extends through the bore 1.9. The force to be coupled into the anchoring element as well as the mechanical vibrations are transmitted from the tool to the anchoring element via the base plate, the same as shown in FIG. 4. After the anchoring there are three ways of dealing with the tool.

Firstly, provided the bore in the object is a through-going bore, the tool is separated from the oscillation generator and removed towards the distal side. Secondly, the tool is also separated from the oscillation generator and remains with the anchoring element, where it fulfils a predetermined function, e.g. serves for attaching a further item. Thirdly, the tool is dismantled after the anchoring, e.g. the shaft 3.4 is separated from the base plate 3.5.

The following variants are conceivable:

The cross-sections of the bore in the object and of the anchoring element are not circular.

The tool is removable as a whole toward the proximal side if the cross-sections of the recess 1.9 and of the base plate 3.5 are not circular and the base plate 3.5 is able to be moved through the recess 1.9 in one specific rotational position.

The anchoring element is not necessarily conical. Thus e.g. the bore in the object can get narrower toward the proximal side. While providing such a bore is generally difficult, there may still be cases in which this is favored by other circumstances.

It is also possible that the anchoring element as well as the bore in the object are e.g. cylindrical, i.e. their cross-sections remain constant along their axes. Then the cross-section of the anchoring element would be slightly larger than that of the bore in the object, so that the anchoring element is held in the bore by a press-fit. The frictional force may be strong enough to act as counter force to the force coupled into the anchoring element by the tool. Alternatively a counter-element can be used in this embodiment.

Figure 14B:
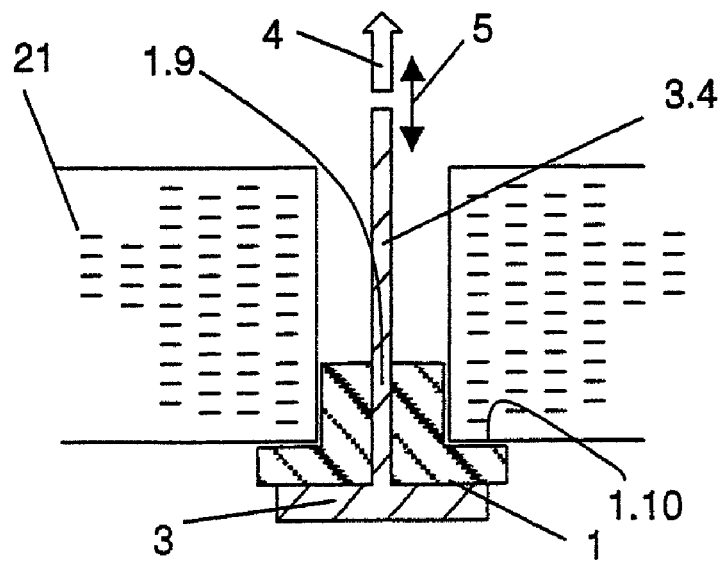

A further embodiment is illustrated in FIG. 14b. The anchoring element 1 has a shoulder 1.10 being pressed against an equivalent shoulder of the object during anchoring. In the illustrated case, the mouth of the bore forms the shoulder of the object, however it could also be designed as stepped or as another widening of the bore. FIG. 14b is a further example of an embodiment of the second aspect of the invention, in which the anchoring does not necessarily occur in the lateral walls of the bore.

Figure 15:
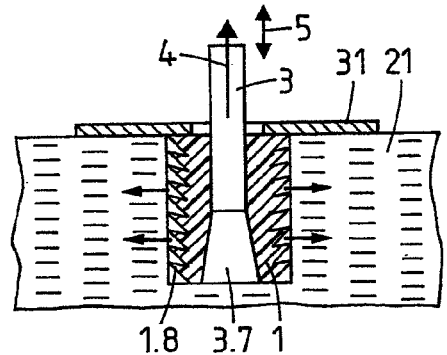
FIGS. 15 and 16 show embodiments of a combination of the second aspect and the third aspect of the invention.
Figure 16:
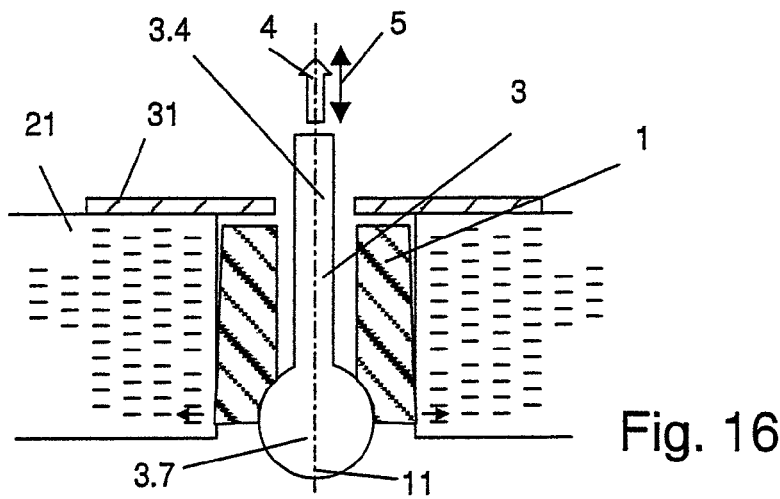
Figure 17:
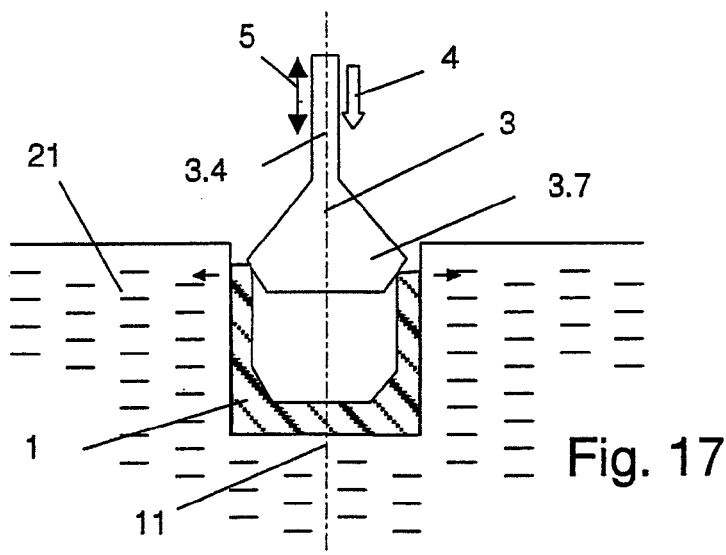
FIG. 17 illustrates a further embodiment according to the third aspect of the invention.

The following FIGS. 15 to 17 show embodiments according to the third aspect of the invention. The configurations in the examples according to FIGS. 15 and 16 correspond also with the second aspect of the invention.

In the configuration according to FIG. 15 a through-going or blind bore is provided in the object 21 in which the anchoring element is introduced prior to the anchoring. The anchoring element 1 comprises a through-going or blind recess. The tool 3 comprises a shaft 3.4 and a wedge 3.7 tapering from the distal to the proximal side, where it is attached to the shaft. During anchoring a pulling force 4 causes the wedge to be drawn through the recess of the anchoring element 1 thereby expanding the latter. Thus, a peripheral area of the anchoring element is pressed against a lateral wall of the bore in the object. The mechanical vibrations being coupled simultaneously into the anchoring element cause the thermoplastic material to liquefy where it is in contact with the object and to be pressed into cavities in the object. Advantageously the mechanical vibrations also cause the thermoplastic material to at least soften between the recess and the peripheral area. This softening leaves the anchoring element free of tension after the removal of the tool, thus preventing forces directed radially inwards acting on peripheral areas anchored in the object.

While the pulling force is exerted upon the tool a counter-element 31 prevents the anchoring element from being drawn out of the bore. In the illustrated example the anchoring element 1 comprises peripheral, here pointed energy directors 1.8, which assist liquefaction of the liquefiable material. Energy directors can also be provided on anchoring elements according to other embodiments of the invention described in this document.

FIG. 16 shows an embodiment similar to the one of FIG. 15, wherein the tool is of a different shape. Instead of a wedge the distal end portion of the tool is e.g. fashioned like a spherical swelling 3.7. During anchoring this distal end portion is drawn through the anchoring element while the thermoplastic material is liquefied and causes an advantageously plastic expansion of the anchoring element as in the example according to FIG. 15.

Alternatively, the tool may comprise instead of a shaft 3.4*a* a non-rigid element, e.g. a thread or a cable for pulling the distal end portion through the anchoring element. The distal end portion may again be spherical like in FIG. 16.

Further alternatives are conceivable:

A thickened distal end portion 3.7 of the tool can have many different shapes; the largest cross-section of the distal end portion must always be larger than the smallest cross-section of the recess in the anchoring element and smaller than the cross-section of the bore in the object.

The recess of the anchoring element 1 does not need to be through-going; moreover the tool can already be positioned in the recess designed as a blind hole prior to the anchoring procedure and is then moved within or withdrawn from this recess during the anchoring procedure. The advantage of such a configuration is the fact that the appropriate tool can be sold and stored together with the anchoring element and the tool can also assist in positioning of the anchoring element.

The bore in the object can either be through-going or blind.

A further object to be fixed to the object during the anchoring process may be placed between the tool and the anchoring element or between the anchoring element and a lateral wall of the bore in the object. This also applies to the other embodiments according to the third or first aspect of the invention.

FIG. 17 shows a further embodiment according to the third aspect of the invention, wherein the force for expanding the anchoring element during the anchoring acts as compression load on the tool. While the distal end portion 3.7 of the anchoring element in embodiments like the ones according to FIGS. 15 and 16 must comprise a component with a growing cross-section from the proximal to the distal side, in embodiments like the one according to FIG. 17, in which the tool is under compression load, a distal end portion with a growing cross-section from the distal to the proximal side is advantageous. In the illustrated example the distal end portion of the tool is designed like this.

For embodiments in which the force expanding the anchoring element acts on the tool as compression load, the tool does not need to comprise a thickening of its distal end portion in order to taper toward the proximal side. It can be e.g. cylindrical, possibly even tapering toward the distal side.

In the embodiment illustrated in FIG. 17 the anchoring element is shaped like a cup and rests upon the bottom of the bore in the object. The anchoring element can also be tubular or of another shape comprising a recess.

Figure 17A:
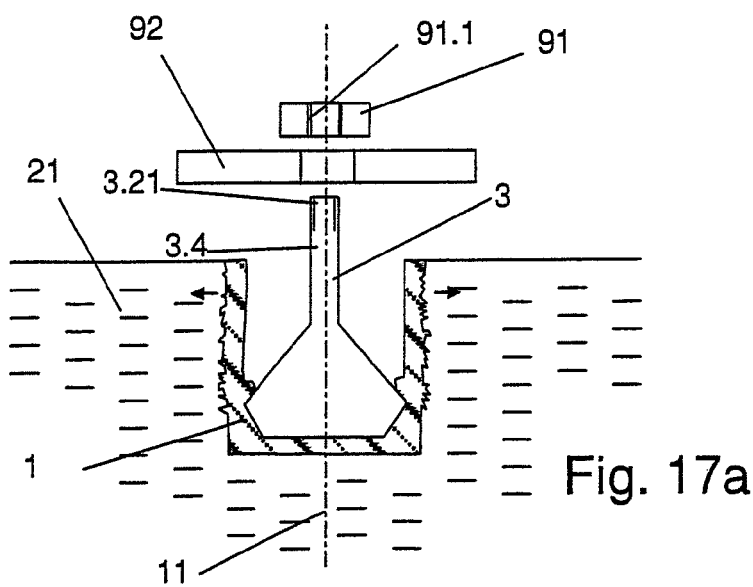
FIG. 17a shows the embodiment of FIG. 17 after the anchoring process.

In the embodiment of FIG. 17, the tool 3 can be shaped so that it can be removed after anchoring, for example if it narrows towards the distal side. As an alternative, the tool can be shaped so that it comprises a retaining structure (in the depicted embodiment formed by the shown shoulder) and itself serves as an anchoring element after the anchoring process. FIG. 17*a* depicts the tool 3 as comprising a threading 3.21 designed to co-operate with a threading of a further element 91, that in the figure is schematically depicted to be a screw nut for affixing a plate 92 to the construction object 21.

The tool of the embodiment according to FIG. 11 has, in addition to the effect of compressing the anchoring element, to some extent an expanding effect. The configuration according to FIG. 11 therefore corresponds with the first and the second aspect as well as with the third aspect of the invention.

Anchoring elements according to the third aspect of the invention are advantageously made entirely of the thermoplastic material. Non-thermoplastic components may be provided, e.g. at the base of a cup-shaped anchoring element, at the periphery of an area where no expansion is desired, or as a reinforcing element designed and situated not to obstruct the expansion. In the case of a tube- or cup-shaped anchoring element such reinforcements can e.g. be of an elongated shape and extend spread out on the circumferential surface of the anchoring element in axial direction.

In all embodiments according to the first and the third aspect of the invention, the opening (if present) in the anchoring element does not need to be central. A corresponding asymmetrical configuration can be used in order to specifically liquefy or plastify the thermoplastic material on one side of the anchoring element earlier than on the opposite side, or it may be intended that the thermoplastic material only liquefies or plastifies on one side.

Figure 18:
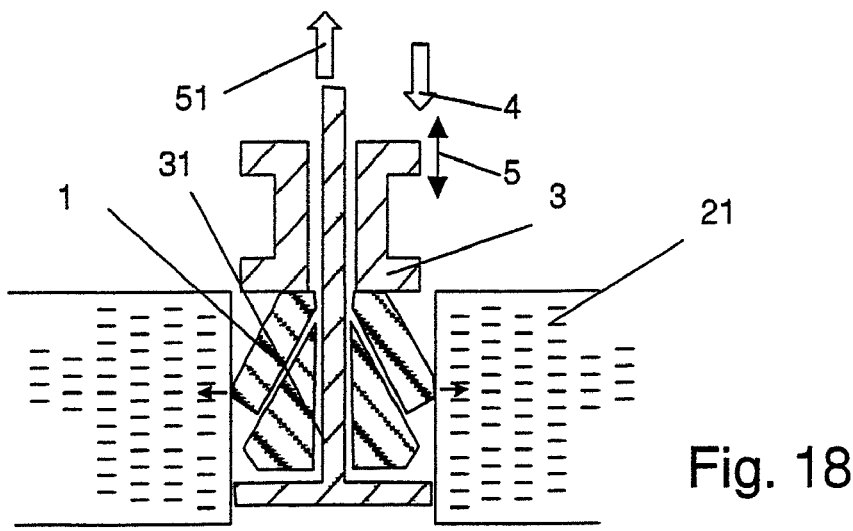
FIG. 18 illustrates the principle of a distal counter-element.

Also in cases, where the tool is under compression load, a counter-element 31 can be applied. Such an element acts on the distal side of the anchoring element and is e.g. held by a shaft extending centrally through the tool, as illustrated in FIG. 18 which shows an example according to the first aspect of the invention. In such cases it is not necessary for embodiments according to the first aspect of the invention that the tool 3 is moved when force 4 is coupled into it. Instead, the counter-element 31 coupling the counterforce 51 into the anchoring element can be moved during the anchoring procedure. Combined motions of the tool and the counter-element are also possible. It is further possible that the counter-element 31 is designed as a tool and therefore also couples mechanical vibrations into the anchoring element, i.e. the mechanical vibrations are coupled into the anchoring element from two sides. Finally, the counter-element can also be held by a non-rigid element—e.g. a thread or a cable—from the proximal side. It may also be intended that the distal part 1.11; 1.14 of a multi-part embodiment of the anchoring element, as e.g. the one according to FIGS. 3*a*, 3*b*, 3*c*, can be held by such a non-rigid element, which extends e.g. through an eyelet in the distal anchoring element component. This has the advantage that the non-rigid element can be removed after anchoring e.g. by severing it and subsequently pulling at it from the proximal side.

Figure 19:
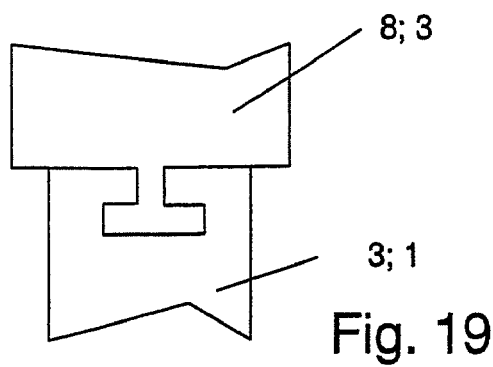
FIG. 19 shows a coupling suitable for transmission of a pulling force.

In all embodiments designed according to the second aspect of the invention the force 4 to be coupled into the anchoring element acts a tensile force on the tool 3 or (as in configurations according to FIG. 18) if necessary on the counter-element 31. This requires an appropriate coupling means on the vibratory device, which does not only need to be suitable for tensile loading but also for the transmission of mechanical vibrations while under tensile loading. Such coupling means are known to one skilled in the art. They are often based on a form fit (screw joints, snap fastenings, bayonet catches, etc.) or possibly a material fit (glued, welded or soldered connections) or a friction fit (clamped connections). Such generally known coupling means are not further discussed here. The principle of a form-fit coupling means is shown in FIG. 19. This coupling can be used as shown or in an alternative form. The vibratory device comprises an extension protruding into a clearance at the proximal end of the tool 3 and widening towards its distal end so that it can transmit a tensile force. For coupling the tool 3 to the vibratory device, these are moved perpendicular to the plane of FIG. 19 relative to each other. Dovetails or similar modifications may be considered. In embodiments such as shown in FIG. 13 these or other coupling means can also be used to transmit tensile forces from the tool 3 to the anchoring element 1.

The anchoring process requires the application of a force onto the anchoring element. In most embodiments of the second aspect of the invention and of the third aspect of the invention in many embodiments of the first aspect, and of course also in combined aspects, the force is applied between the tool 3 and a counter element instead of between the tool and the object itself. In accordance with a special principle of the invention that can be applied in all situations where the force is applied between the anchoring element and a counter element, the force may be applied by hand by the person applying the method. As an alternative, the force may be applied by means of some mechanism that just has to be activated by the person. Such means may in addition provide for a well-defined force.

Figure 20:
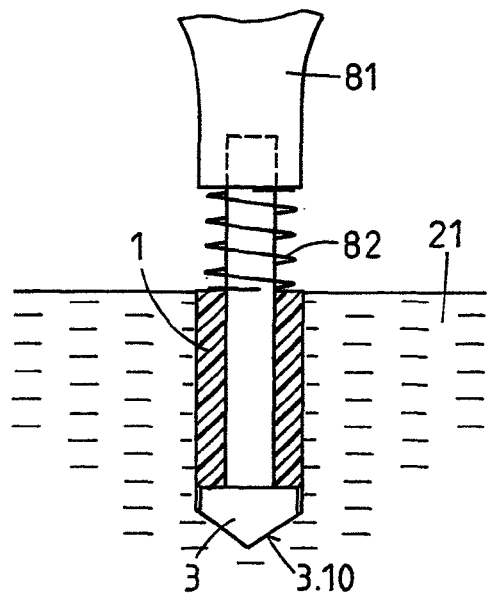
FIG. 20 shows a principle of applying a counter-force by means of a spring.

An example of such a mechanism is a spring mechanism as very schematically illustrated in FIG. 20. In the embodiment of FIG. 20, the tool 3 is of the kind remaining, after anchoring, in place and being designed for a further function. In embodiments where the liquefiable material after anchoring sticks to the tool, the tool may be viewed as being part of the anchoring element after anchoring. The anchoring element 1 is merely illustrated as being tube shaped in FIG. 20; it may, for example, comprise a slit and be configured as described in FIGS. 1a through 2b. Both, the tool and the anchoring element may alternatively also be configured as any other tool/anchoring element described in this text or as any other embodiment of the invention. Between the ultrasonic device 81 rigidly attached, during anchoring, to the tool 3, and the anchoring element 1, a spring 82 is arranged. The spring exerts a force between the anchoring element and (via the ultrasonic device 81) the tool. The spring may be configured so that the force is sufficient for the anchoring process, thus during the application of the mechanical vibrations, the tool is pressed against the anchoring element by said force. This approach is advantageous in situations where the force during the process should be well defined.

In the illustrated version of the "force applying mechanism" embodiment of the invention, the spring is in direct contact with the anchoring element, the distal surface of the spring serving as the counter element. However, a separate, for example, plate like counter element may be arranged between the spring and the anchoring element (not illustrated). The provision of a plate like counter element has the additional advantage that the proximal end position of the anchoring element is defined during the anchoring process.

A further feature of the embodiment of FIG. 20, which may be implemented for different embodiments of the invention, especially for embodiments according to the second and third aspect, and independently of the "force applying mechanism", is the provision of a drilling functionality for the tool 3. To this end, the tool 3 comprises a distal end surface 3.10 designed to be driven into the construction material. The distal end surface may be tip shaped and may in addition comprise reaming structures, as for example known from WO 2005/079 696.

Figure 21:
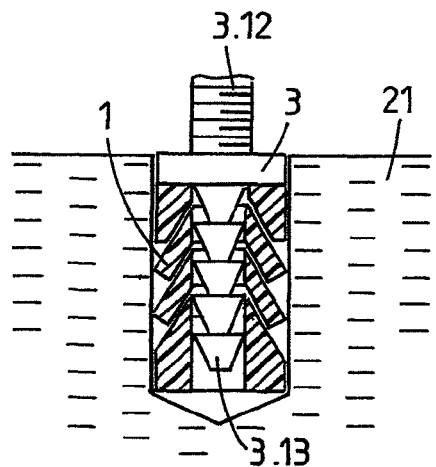
FIG. 21 illustrates yet a further variant of an anchoring element and method according to the first aspect of the invention.

In embodiments where the tool 3 remains in place after anchoring, the tool often is provided with a distal portion with a larger cross section, said distal portion being arranged distal of a main portion of the anchoring element (c.f. FIG. 4, FIG. 20). In embodiments where the necessary force is applied to the tool as a compressive force, this is often not an option, as the tool there is moved "forward", i.e. towards a distal side during anchoring. FIG. 21 illustrates an embodiment of such "forward" anchoring, where the tool 3 may nevertheless remain in the place of the anchoring after anchoring. To this end, the tool is provided with retaining structures 3.13 that cause the tool to be retained by the anchoring element 1 after anchoring. In FIG. 21, also a thread 3.12 of the tool is illustrated that may be used to fix some other object to the anchoring element.

Figure 22A:
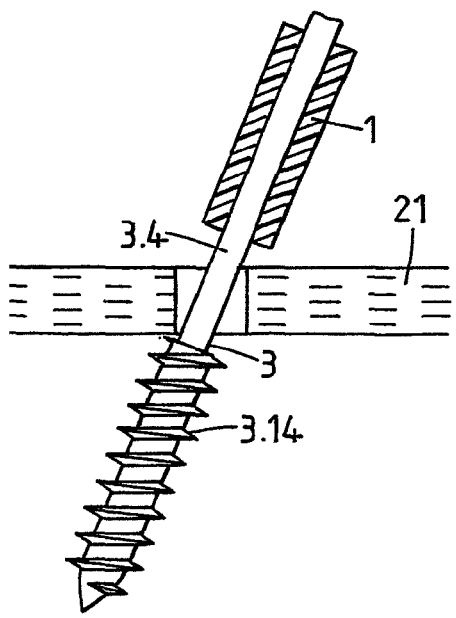
FIGS. 22a and 22b show yet an other embodiment of the invention.
Figure 22B:
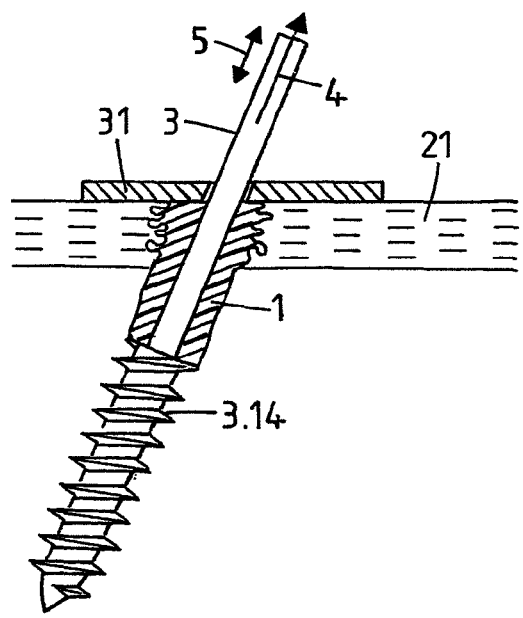

FIGS. 22a and 22b illustrate an other embodiment of the second aspect of the invention that is especially suited for affixing the anchoring element to a plate like object. The tool 3 is provided with reaming structures 3.14 with a larger external diameter than the shaft 3.4. The tool is first used to drill a hole into the object by means of the reaming structures. Thereafter, the tube shaped anchoring element 1 is pushed on the shaft. The external and internal diameters of the anchoring element 1 are such that it can pass through the hole, but abuts the reaming structures 3.14. For anchoring, the anchoring element is pressed against the counter element 31 by pulling the tool 3, the anchoring element being compressed between the tool and the counter element. The liquefiable material liquefies in contact with the object material, and if this construction material is hard with little porosity, it may ooze out on the distal side of the object, form a bulge and thereby act in a blind rivet like manner.

Instead of the tool comprising the reaming structures, it may also comprise a distal enlargement by which the force may act on the tool, and the hole in the object may then be drilled by an instrument different from the tool.

Figure 23A:
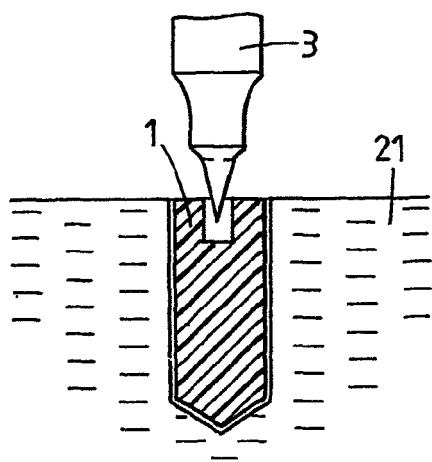
FIGS. 23a and 23b show a further embodiment of the third aspect of the invention.
Figure 23B:
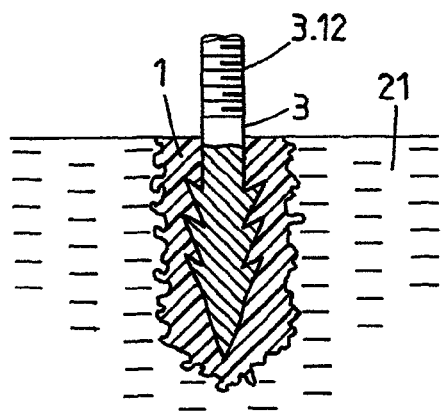

Referring to FIGS. 23a and 23b, 24a, 24b, and 25, further examples of the third aspect of the invention are described. The embodiments of anchoring elements 1 shown therein comprise an anchoring element section (in both depicted embodiments the anchoring elements consist of said section) consisting of a thermoplastic material, where during anchoring a distal portion of the tool 3 protrudes into an interior of said section and during anchoring spreads the anchoring element section from inside. This results in lateral forces onto the interfaces between the anchoring element and the object surface, thereby improving anchoring in lateral walls of the construction material. The depicted embodiments show two possibilities to spread the anchoring element, by the tool, from the inside:

The tool 3 is driven into the anchoring element during the anchoring process, thereby enlarging an outer cross section (FIGS. 23a, 23b). The tool in the shown embodiment comprises barb-like structures for the tool being kept fixedly in the anchoring element after anchoring.

Figure 24A:
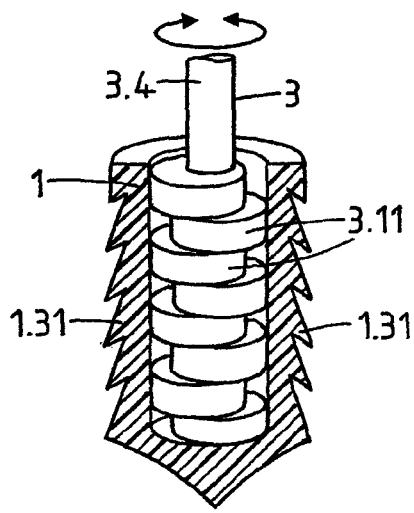
FIGS. 24a and 24b show yet an other embodiment of the third aspect of the invention.
Figure 25:
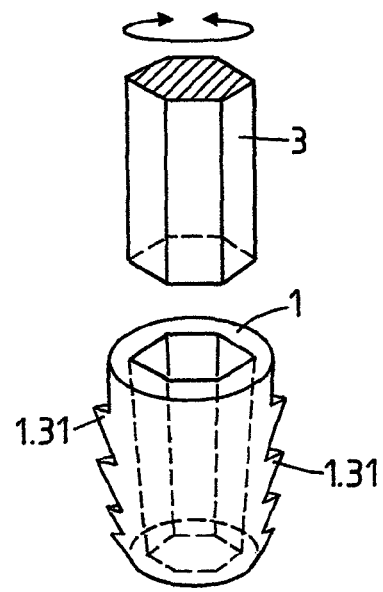
FIG. 25 shows a variant of the embodiment of FIGS. 24a and 24b.
Figure 24B:
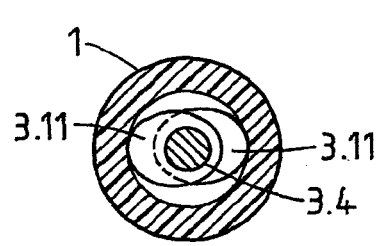

The tool is not rotationally symmetric and is rotated during the anchoring process, while rotation of the anchoring element is inhibited (FIGS. 24, 24b, 25). In FIGS. 24a, 24b, the tool comprises a plurality of eccentrics 3.11, whereas in FIG. 25 both the tool and the opening in the anchoring element are translation symmetric but not rotational symmetric, and are, in the illustrated embodiment, hexagonal in cross section. The depicted anchoring elements 1 comprise barb like protrusions 1.31 inhibiting rotation.

The embodiments of FIGS. 21-23 are all (further) examples of embodiments of the invention where the tool 3 remains, after the anchoring process, in situ, and may serve as fasteners. The embodiments of these figures, therefore, also correspond to the above mentioned further aspect of the invention. FIGS. 26-29 show further variants, where the first, second, and/or third aspect of the invention may be used for affixing a fastener to the construction object, the fastener at the same time serving as the tool 3 coupling the mechanical oscillations and the force into the anchoring element during the anchoring the process.

Figure 26A:
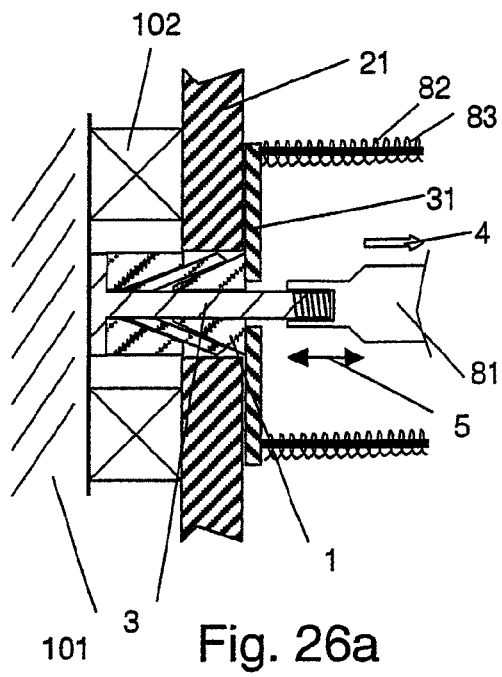
FIGS. 26a and 26b illustrate a method of fastening a fastener to a board by a combination of the first and second aspect of the invention.
Figure 26B:
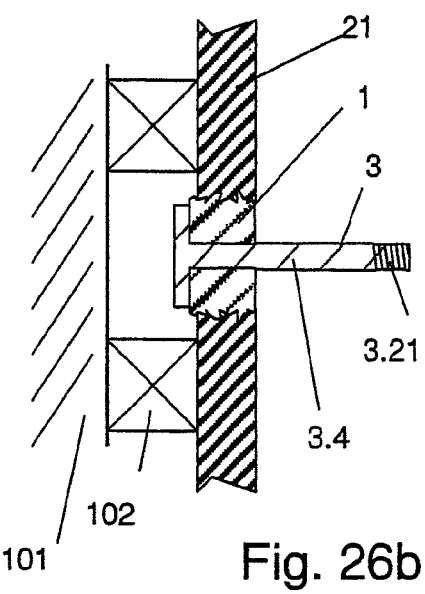

The anchoring element 1 shown in FIG. 26a is of the kind described for example referring to FIGS. 3a and 4. It is anchored in a board 21 of, for example, relatively soft and/or brittle material such as plaster or a wood compound. Behind the board 21, there is a cavity, as the board is affixed by distance holders 102 to a wall 101. The method according to the invention allows to soundly affix the tool 3—that after the anchoring serves as fastener, here with a threading 3.21—to the relatively weak board, because the liquefied material during the anchoring is primarily pressed in lateral directions and does not cause the board to be torn at the interface to the anchoring element. FIG. 26b illustrates the situation after the anchoring process.

FIG. 26a further illustrates the generation of the force between the counter element 31 and the tool 3 by way of a spring element 82, in the shown embodiment illustrated to comprise a plurality of springs guided by a spring guide 83.

Figure 27:
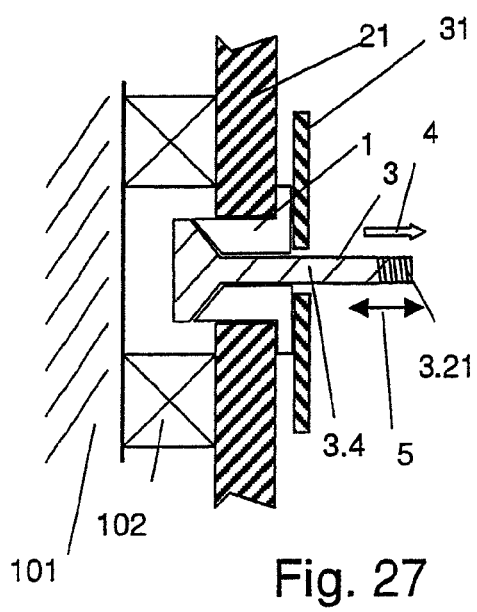
FIG. 27 shows a method of fastening a fastener to a board by a combination of the second and third aspect of the invention.

The set-up shown in FIG. 27 differs therefrom in that the tool 3 and anchoring element correspond to the third aspect of the invention and are of the kind described referring to FIG. 11 or FIG. 17 (but with "rearward" anchoring, according to the second aspect).

FIGS. 26a, b, and 27 illustrate that the approach according to any one of three aspects of the invention is especially suited to attach a fastener to a hollow object, for example with comparably weak walls.

Figure 29:
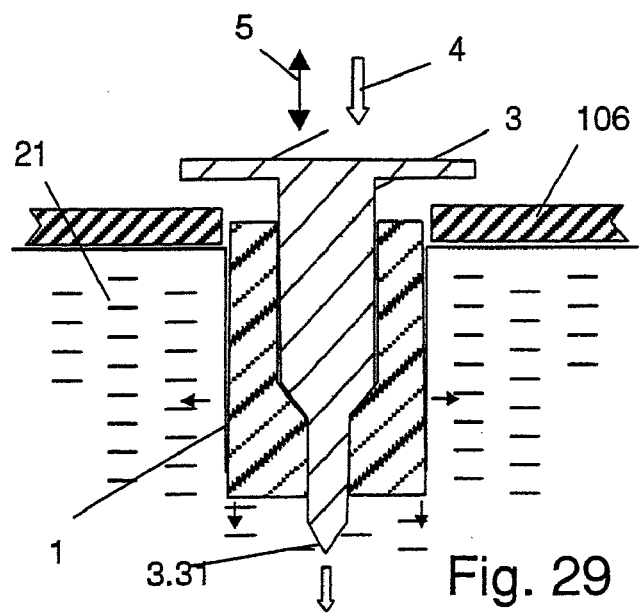
FIGS. 28 and 29 illustrate two variants of a further use of the third aspect of the invention.
Figure 28:
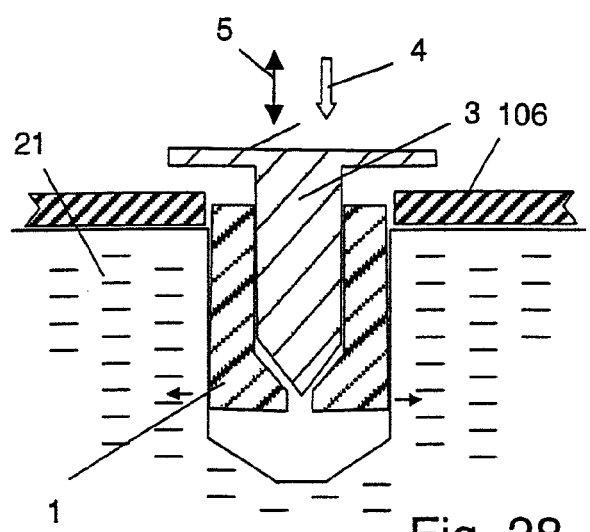

FIGS. 28 and 29 show an embodiment of the third aspect of the invention for fixing a fastener/tool 3 with a fastener head (a "nail") to the construction material object 21. The tool is such as to spread the anchoring element 1 during the anchoring process and to be welded thereto. Due to the approach according to the invention, i.e. the use of an anchoring element as a kind of dowel for fixing the fastener 3, the fastener can also be attached to a material that would normally tend to tear/flake off when a nail is driven into it, such as cardboard, poor quality wool composites, plaster etc. This is because the liquefied material interpenetrates structures of the material in a liquid state (thus, there are no shear forces) and after re-solidification is anchored relatively deep into it.

In the illustrated embodiments, the fastener is used to nail a board 106 to the object, this, of course being by no means the only use of a fastener and being shown for illustration purposes only.

The embodiment of FIG. 29 differs from the basic embodiment of FIG. 28 in that in addition to the positive-fit anchoring by the anchoring element 1, the tool 3 is also fastened like a conventional nail or pin by means of a tip 3.31 driven into the construction material 21, and the anchoring element and the tool are configured such that the anchoring element is also pressed into the construction material in a forward direction (as illustrated by the arrows in the Figure).

Anchoring elements, devices and anchoring methods according to the illustrated or other embodiments of all aspects of the invention find their use in various situations where a firm connection between the anchoring element and the object is important. For specific applications reference is made to all applications as described in the publications WO 98/42988, WO 00/79137 and WO 2006/002 569, whose contents are incorporated herein by reference.

The invention claimed is:

1. A method of anchoring an anchoring element in an object of construction material, which anchoring element is compressible in the direction of a compression axis under local enlargement of a distance between a peripheral surface of the anchoring element and the compression axis, wherein the anchoring element comprises a coupling-in face not parallel to the compression axis for the coupling-in of a compressing force and mechanical vibration, and wherein the anchoring element further comprises a thermoplastic material forming at least a part of the peripheral surface of the anchoring element, the method comprising the steps of:
providing a bore in the object;
positioning the anchoring element in the bore;
coupling the compressing force and the mechanical vibrations via the coupling-in face into the positioned anchoring element, whereby the anchoring element is compressed and due to the distance enlargement at least locally pressed against lateral walls of the bore and the thermoplastic material is at least partly liquefied from a solid to a liquid state by the mechanical vibrations where in contact with the lateral walls and pressed into structures of the object to form, after re-solidification, a form-fit connection with the lateral walls.

2. The method according to claim 1, wherein, on positioning the anchoring element in the bore, the compression axis is directed essentially parallel to an axis of the bore.

3. The method according to claim 1, wherein the anchoring element comprises at least two components which are moved relative to each other by the effect of the compressing force by being shifted along shifting surfaces extending obliquely to the compression axis.

4. The method according to claim 3, wherein at least one of said at least two components is spread by the effect of the compressing force.

5. The method according to claim 3, wherein at least some of the components of the anchoring element comprise thermoplastic material along the shifting surfaces and wherein a mechanical energy coupled into the anchoring element by the mechanical vibrations is sufficient to weld the components together irreversibly after the coupling of the vibrations and the subsequent re-solidification.

6. The method according to claim 1, wherein the anchoring element consists of one piece and is deformed by the effect of the compressing force.

7. The method according to claim 6, wherein the compressing force causes the anchoring element to spread or buckle.

8. The method according to claim 1, wherein the anchoring element comprises at least two components which are moved relative to each other by the effect of the compressing force by being shifted along shifting surfaces extending obliquely to the compression axis or wherein the anchoring element consists of one piece and is deformed by the effect of the compressing force and wherein tensions in the components generated by the deformation or the spreading or buckling respectively are reduced by the effect of the mechanical vibrations.

9. The method according to claim 1, wherein the anchoring element comprises at least two components which are moved relative to each other by the effect of the compressing force by being shifted along shifting surfaces extending obliquely to the compression axis or wherein the anchoring element consists of one piece and is deformed by the effect of the compressing force and wherein a separate auxiliary element is used for assisting the spreading or the deformation.

10. The method according to claim 1, wherein the compressing force is exerted between a tool and a counter-element, wherein the tool is in contact with the coupling-in face and wherein the counter-element does not load the object.

11. The method according to claim 1, wherein the step of coupling the compressing force into the anchoring element includes applying the compressing force by means of a spring element.

12. The method according to claim 1, wherein the coupling-in face is at least partly even and oriented perpendicular to the direction of the compression axis.

13. The method according to claim 1, wherein prior to the step of coupling in compressing force and mechanical vibrations, at least part of the peripheral surface of the anchoring element comprises a thermoplastic material and is in contact with a wall of the bore.

14. The method according to claim 1, further providing a source of vibrations and a step of generating mechanical vibrations by the source of vibrations.

15. A method of anchoring an anchoring element in an object of construction material with the aid of mechanical vibrations, wherein the anchoring element comprises a coupling-in face suitable for transmission of mechanical vibrations, and which anchoring element further comprises a thermoplastic material, which forms at least a part of the surface of the anchoring element, the method comprising the steps of:
  positioning the anchoring element on the object in such a way that areas of the anchoring element comprising the thermoplastic material are in contact with the object;
  coupling a force and mechanical vibration via the coupling-in face into the positioned anchoring element, whereby the thermoplastic material is at least partly liquefied from a solid to a liquid state by the mechanical vibration where in contact with the object and pressed into the object to form a form-fit connection with the object after re-solidification,
  wherein the force and the mechanical vibrations are coupled into the anchoring element from a tool, into which the mechanical vibrations are coupled on a proximal side and which comprises a coupling-out face on a distal side, across which the mechanical vibrations are coupled into the anchoring element, and wherein either the force being coupled into the tool is a tensile force or a counter-element is provided for exerting a counter-force opposed to said force, wherein said counterforce is coupled as a tensile force into the counter-element.

16. The method according to claim 15, wherein a bore is provided in the object prior to the positioning of the anchoring element, and the anchoring element is positioned within said bore.

17. The method according to claim 16, wherein the counter-element is positioned above the mouth or on the bottom of or inside the bore in the object.

18. The method according to claim 16 wherein, for counter-acting the force, coupled from the tool into the anchoring element, a counter-element is positioned on a mouth or on a bottom of or inside the bore in the object.

19. The method according to claim 15, wherein the step of coupling the tensile force into the tool or the counter element includes applying the tensile force by means of a spring element.

20. The method according to claim 15, wherein the anchoring element is compressible in the direction of a compression axis under local enlargement of a distance between a peripheral surface of the anchoring element and the compression axis, wherein the anchoring element comprises a coupling-in face not parallel to the compression axis for the coupling-in of a compressing force and mechanical vibration, and wherein the anchoring element further comprises a thermoplastic material forming at least a part of the peripheral surface of the anchoring element, and wherein for coupling the force and the mechanical vibrations into the anchoring element, the coupling out face of the tool is pressed against the coupling-in face of the anchoring element.

21. A method for anchoring an anchoring element in an object with the aid of mechanical vibrations, which anchoring element comprises an axis and a thermoplastic material, which forms at least a part of the surface of the anchoring element, the method comprising the steps of:
  providing a bore in the object;
  positioning the anchoring element in the bore;
  providing a tool having a proximal portion and a distal end portion;
  positioning the tool in contact with to the anchoring element;
  coupling the mechanical vibrations into the tool and simultaneously moving the tool relative to the anchoring element in axial direction, a portion of the tool moving in an interior of the anchoring element, and thereby expanding the anchoring element and pressing the anchoring element at least locally against lateral walls of the bore and, due to the expansion and the effect of mechanical vibrations coupled into the anchoring element from the tool, liquefying the thermoplastic material at least partly, from a solid to a liquid state, where in contact with the wall of the bore to yield liquefied thermoplastic material, and pressing the thermoplastic material into the construction material in order to form a positive-fit connection with the wall after re-solidification.

* * * * *